(12) United States Patent  
Johns et al.

(10) Patent No.: US 9,138,709 B2
(45) Date of Patent: Sep. 22, 2015

(54) DEVICE AND METHOD FOR DISPENSING PELLETS

(75) Inventors: Clifford L. Johns, Louisville, KY (US); Munaf Chasmawala, Louisville, KY (US); Dennis McAndrews, Jeffersonville, IN (US)

(73) Assignee: Extundo Incorporated, Louisville, KY (US)

( * ) Notice: Subject to any disclaimer, the term of this patent is extended or adjusted under 35 U.S.C. 154(b) by 558 days.

(21) Appl. No.: 13/489,518

(22) Filed: Jun. 6, 2012

(65) Prior Publication Data

US 2013/0140322 A1    Jun. 6, 2013

Related U.S. Application Data

(63) Continuation-in-part of application No. 13/102,662, filed on May 6, 2011, now Pat. No. 8,646,492.

(60) Provisional application No. 61/347,483, filed on May 24, 2010.

(51) Int. Cl.
*B01J 8/00* (2006.01)
*B01J 8/06* (2006.01)

(52) U.S. Cl.
CPC  *B01J 8/003* (2013.01); *B01J 8/002* (2013.01); *B01J 8/067* (2013.01); *B01J 2208/00752* (2013.01)

(58) Field of Classification Search
CPC ... B01J 2208/00752; B01J 8/002; B01J 8/003
USPC ........................ 141/1, 247, 248, 284; 422/219
See application file for complete search history.

(56) References Cited

U.S. PATENT DOCUMENTS

| | | | |
|---|---|---|---|
| 3,223,490 A | 12/1965 | Sacken |
| 3,913,806 A | 10/1975 | Rred, Jr. |
| 4,402,643 A | 9/1983 | Lytton et al. |
| 4,597,946 A | 7/1986 | Ward |
| 4,701,101 A | 10/1987 | Sapoff |
| 5,626,455 A | 5/1997 | Keller et al. |
| 6,170,670 B1 | 1/2001 | Kato et al. |
| 6,183,232 B1 | 2/2001 | Bequette |
| 6,725,706 B2 | 4/2004 | Johns et al. |
| 7,285,251 B2 | 10/2007 | Johns et al. |
| 7,765,948 B2 | 8/2010 | Johns et al. |
| 7,776,288 B2 | 8/2010 | Dialer et al. |
| 7,836,919 B2 | 11/2010 | Johns et al. |
| 7,861,875 B2 | 1/2011 | Johns et al. |
| 7,878,225 B2 | 2/2011 | Johns et al. |
| 7,897,120 B2 | 3/2011 | Hoffmann et al. |

(Continued)

FOREIGN PATENT DOCUMENTS

| | | |
|---|---|---|
| CN | 2683241 | 3/2005 |
| CN | 1765481 | 5/2006 |
| DE | 19539628 | 4/1996 |

*Primary Examiner* — Timothy L Maust
(74) *Attorney, Agent, or Firm* — Camoriano and Associates

(57) ABSTRACT

A device and method for dispensing pellets from a hopper to a desired delivery point. The hopper receives and holds the pellets at an elevation above the elevation of the desired delivery point. A fixed diameter opening is defined through which the pellets pass in order to reach a conduit that directs the pellets to the desired delivery point. A localized, direct mechanical force is imparted to pellets adjacent to the fixed diameter opening to break up bridges above the opening and allow the pellets to flow through the opening.

6 Claims, 40 Drawing Sheets

(56) References Cited

U.S. PATENT DOCUMENTS

| | | |
|---|---|---|
| 8,166,811 B2 | 5/2012 | Johns |
| 2003/0194360 A1 | 10/2003 | Huziwara |
| 2004/0146457 A1 | 7/2004 | Bence |
| 2007/0196253 A1 | 8/2007 | Stocksiefen et al. |
| 2008/0149215 A1 | 6/2008 | Patureaux et al. |
| 2008/0193267 A1 | 8/2008 | Hoffmann et al. |
| 2008/0302388 A1 | 12/2008 | Johns et al. |
| 2009/0095211 A1 | 4/2009 | Johns et al. |
| 2009/0097958 A1 | 4/2009 | Camoriano et al. |
| 2009/0112367 A1 | 4/2009 | DeCourcy |
| 2009/0145727 A1 | 6/2009 | Johns |
| 2010/0059137 A1 | 3/2010 | Johns |
| 2011/0020186 A1 | 1/2011 | Beech |
| 2011/0083769 A1 | 4/2011 | Sanz et al. |
| 2011/0277421 A1 | 11/2011 | Te Raa et al. |
| 2011/0283666 A1 | 11/2011 | Johns et al. |
| 2012/0000761 A1 | 1/2012 | Bronshtein |

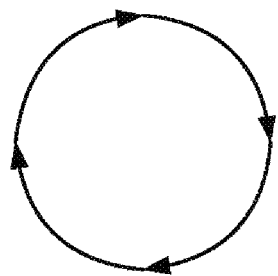
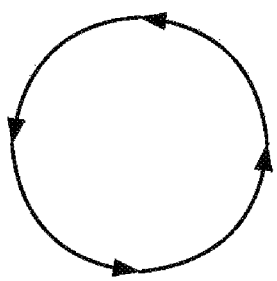
Fig 12AFig 12B
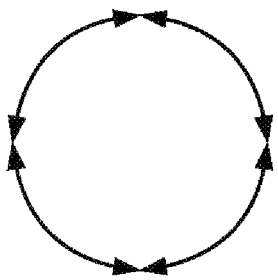
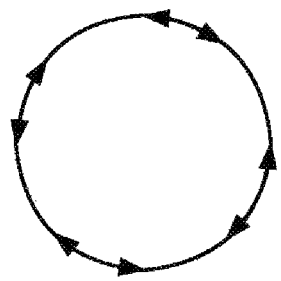
Fig 12CFig 12D
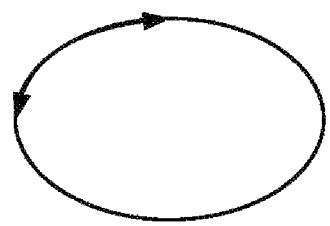
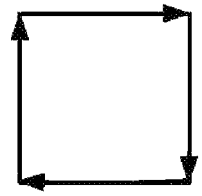
Fig 12EFig 12F
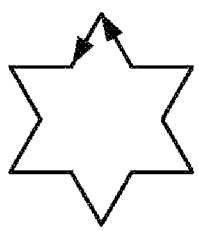
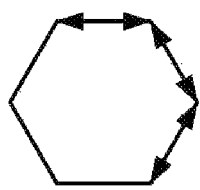
Fig 12GFig 12H

DEVICE AND METHOD FOR DISPENSING PELLETS

This application is a continuation-in-part of U.S. application Ser. No. 13/102,662 filed May 6, 2011, which claims priority from U.S. Provisional Application Ser. No. 61/347,483 filed May 24, 2010, both of which are hereby incorporated herein by reference.

BACKGROUND

The present invention relates to a device and method for dispensing pellets, such as catalyst pellets, to a delivery point, such as into a chemical reactor vessel or into the vertical tubes of a chemical reactor vessel.

Many chemical reactors are essentially a large shell and tube heat exchanger vessel, with the reaction occurring inside the tubes and a coolant circulating in the vessel outside the tubes. A chemical reactor vessel also can be a simple tank with a single volume of catalyst inside it, or it may be a single large tube. Some chemical reactions occur in furnace or reformer tubes, which may be a part of a system with 10 to 500 or more such tubes. In any of these reactor vessels, catalyst, typically in the form of pellets (and other types of pellets that are not catalyst), may be loaded into the reactor to facilitate the reaction. The pellets are replaced periodically.

The reactor tubes may be quite long, housed in a structure several stories tall, and the pellets may be transported up several stories to an elevation above the top of the tubes so they may then flow by gravity into the tubes. The pellets typically are supplied in 2,000 pound (or larger) "super sacks", 55 gallon drums, mini drums, metal bins or plastic bags loaded in pallet-mounted cardboard boxes.

The pellets are then carefully loaded into each reactor tube (there may be several thousand tubes in a single reactor) to try to uniformly fill each tube. It is desirable to prevent bridging of the pellets in the reactor tube, because bridging can create voids or areas within a tube in which there are no pellets. Mechanical devices may be used to aid in the dispensing of the pellets.

In some cases, in a shell and tube reactor in which vertical reactor tubes are supported by upper and lower tube sheets, a template is placed over a portion of the upper tube sheet. The template has openings aligned with the tops of the reactor tubes, with the openings in the templates having a smaller diameter than the inside diameter of the cylindrical reactor tubes in order to restrict the flow of pellets into the reactor tubes to prevent bridging in the tubes. Pellets are dumped on top of the template, and operators then use their gloved hands, paddles, brooms, or rakes to spread the pellets back and forth across the template so that pellets fall through the holes in the template and into the respective reactor tubes. Moving the pellets back and forth breaks up any bridging of the pellets above the template, allowing the pellets to flow through the holes in the template and into the reactor tubes.

In other instances, loading sleeves are inserted into each reactor tube, with each loading sleeve having a top opening that is smaller than the inside diameter of the cylindrical reactor tube in order to limit the flow of pellets to prevent bridging inside the reactor tubes. Again, the pellets are dumped on top of the loading sleeves, and the operators push the pellets back and forth across the loading sleeves so that the pellets fall through the holes in the loading sleeves and into the respective reactor tubes.

Various other dispensing techniques also are known, such as the method taught in U.S. Pat. No. 3,223,490 "Sacken", in which a tray with a plurality of downwardly extending loading sleeves is placed directly above the tube sheet, with the loading sleeves extending into respective reactor tubes. The catalyst is poured onto the tray, and then the tray is vibrated up and down vertically, shaking the pellets to break up any bridges and allow the pellets to fall through the sleeves in the tray and into the reactor tubes. The vibration of the pellets causes them to rub against and impact against each other. Catalyst is a friable material and thus is brittle and readily crumbled. It is desirable to minimize the opportunity for the pellets to rub against or impact against each other or otherwise to be abraded or crushed, because such abrasion and crushing damages the pellets and creates dust. Raking the pellets back and forth across the template or loading sleeves creates substantial abrading of the catalyst pellets, creating dust particles which may not only fall into the reactor tubes creating higher pressure drops than desirable, but which also may become airborne, creating a health hazard for personnel inside the reactor vessel. Vibrating a tray full of catalyst as in the Sacken arrangement also causes the pellets to be jostled and to rub against and impact against each other, which also produces similar results.

SUMMARY

The present invention relates to a device and method for controlled and gentle dispensing of pellets, and does so by breaking up any bridging of the pellets by using a subtle, localized motion that imparts a direct mechanical force to at least one of the pellets adjacent to an opening that is different from the force being applied to the surrounding pellets.

BRIEF DESCRIPTION OF THE DRAWINGS

FIGS. 12A-12H are schematic plan views of some of the possible motions which may be made by the dispensing device of FIG. 10;

DESCRIPTION

Figure 1:
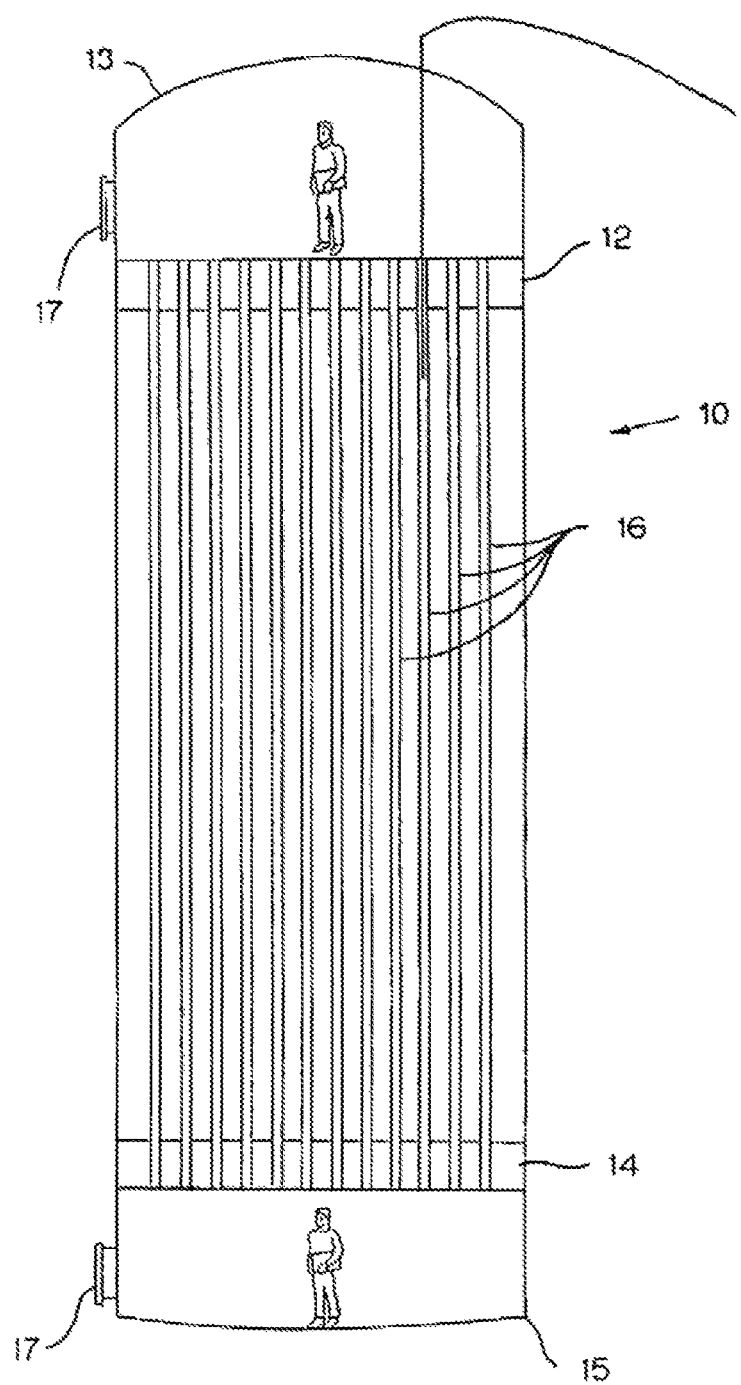
FIG. 1 is a schematic, section view of a shell and tube type of chemical reactor vessel.

FIG. 1 depicts a typical chemical reactor vessel 10, which is a shell and tube heat exchanger, having an upper tube sheet 12 and a lower tube sheet 14 with a plurality of vertical tubes 16 welded or expanded to the tube sheets 12, 14 to form a tightly packed tube bundle. There may be from one to many hundreds or even thousands of cylindrical tubes 16 extending between the tube sheets 12, 14. Each tube 16 has a top end adjacent the upper tube sheet 12 and a bottom end adjacent the lower tube sheet 14, and the tubes 16 are open at both ends, except that there may be a clip at the bottom end to retain catalyst pellets inside the tube. The upper and lower tube sheets 12, 14 have openings that are the size of the outside diameter of the tubes 16, with each tube 16 located in its respective openings in the tube sheets 12, 14.

The vessel 10 includes a top dome (or top head) 13 and a bottom dome (or bottom head) 15, as well as manways 17 for access to the tube sheets 12, 14 inside the vessel 10. The manways are closed during operation of the reactor but are opened for access, such as during catalyst handling. In this instance, the tubes 16 are filled with catalyst pellets, which facilitate the chemical reaction. (It may be noted that similarly-shaped shell and tube heat exchangers may be used for other purposes, such as for a boiler or other heat exchanger.)

This particular reactor vessel 10 is fairly typical. Its tubes may range in length from 5 feet to 65 feet, and it is surrounded by a structural steel skid or framework (not shown), which includes stairways or elevators for access to the tube sheet levels of the reactor vessel 10 as well as access to intermediate levels and to a topmost level which may be located at or near the level of the top opening of the reactor vessel 10. On a regular basis, which can be every 2 to 48 months or longer, as the catalyst becomes less efficient, less productive, or "poisoned", it is changed out, with the old catalyst being removed and a new charge of catalyst being installed in the tubes 16 of the reactor vessel 10. Catalyst handling also may have to be done on an emergency basis, on an unplanned and usually undesirable schedule.

A catalyst change operation involves a complete shutdown of the reactor, resulting in considerable cost due to lost production. (The dispensing devices shown and described herein may be used both for the initial loading of a new reactor and for catalyst change operations.) It is desirable to minimize the amount of time required for the catalyst change operation in order to minimize the lost production and accompanying cost caused by the reactor shutdown.

Figure 2:
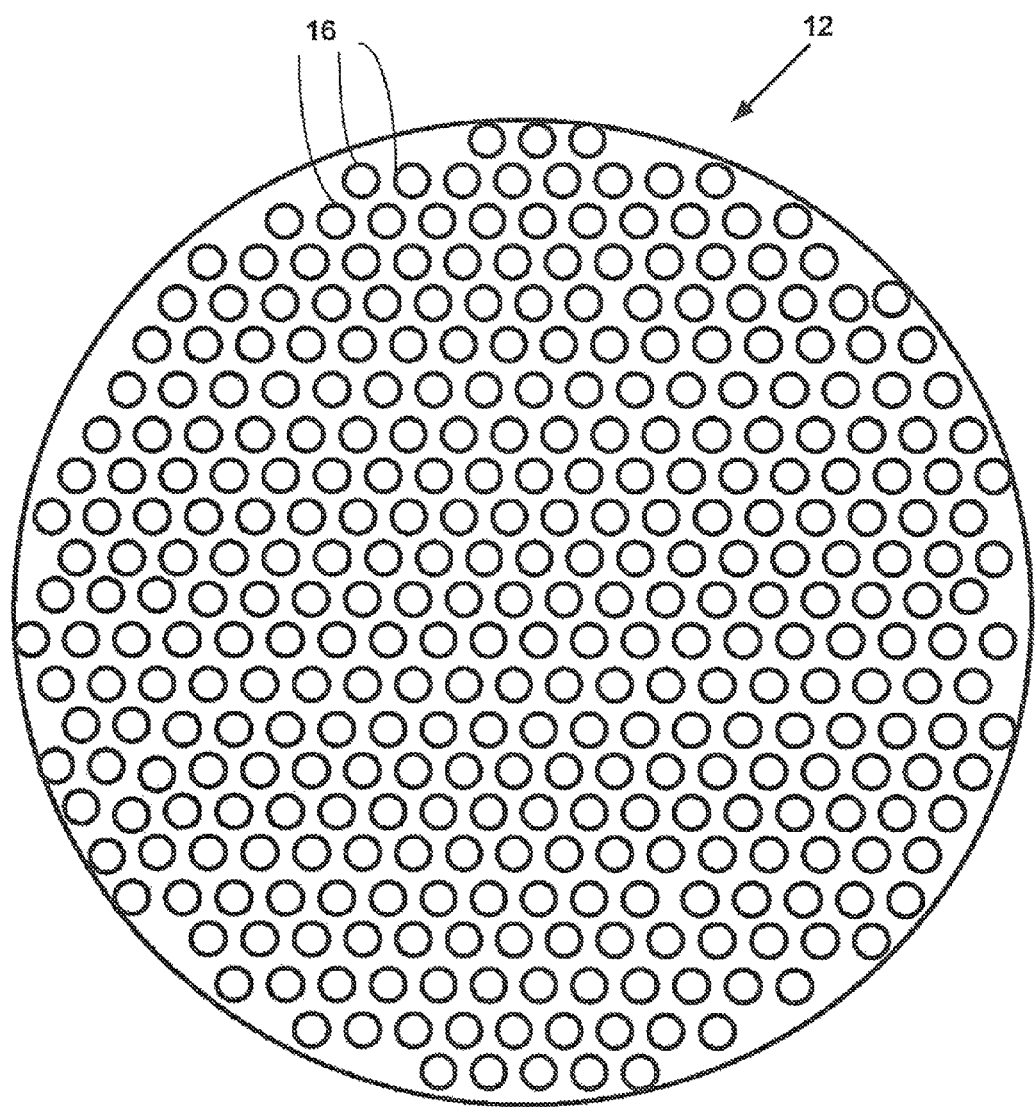
FIG. 2 is a plan view of the upper tube sheet of the reactor of FIG. 1.
Figure 3:
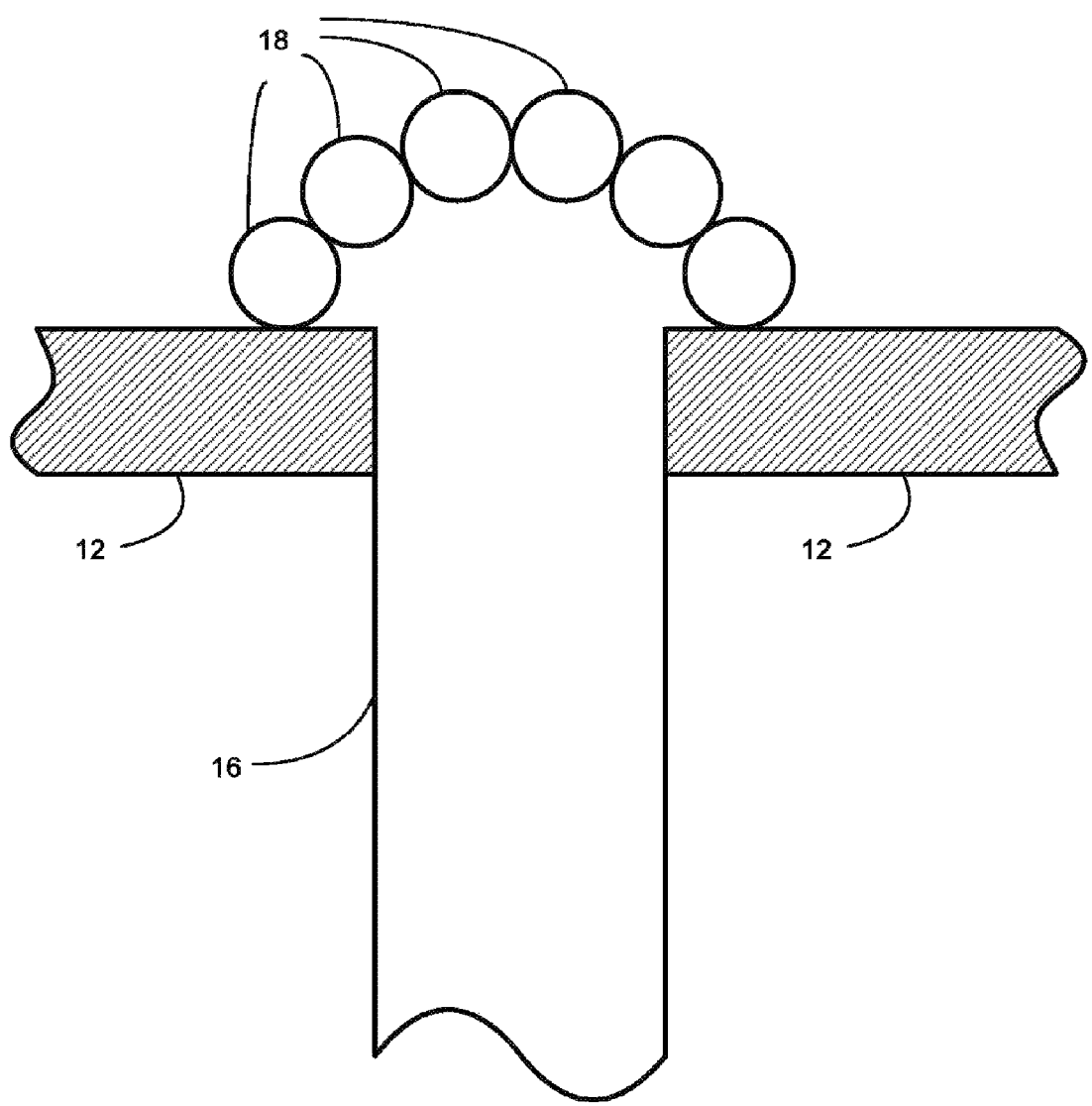
FIG. 3 is a broken away, schematic section view of a single reactor tube, tube sheet, and catalyst pellets, showing the pellets bridging across the top opening of the reactor tube.
Figure 4:
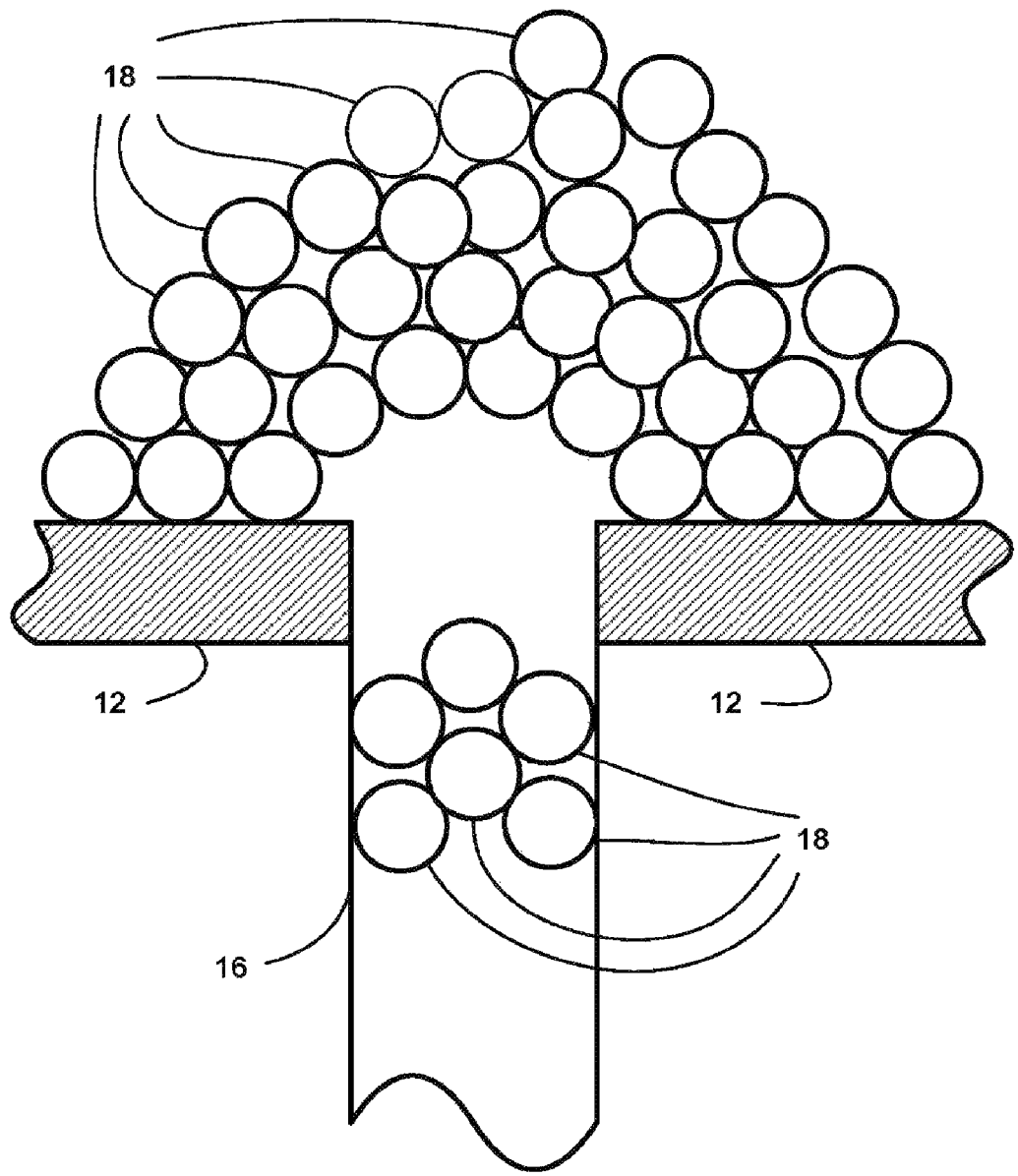
FIG. 4 is a broken away, schematic section view, similar to FIG. 3, but showing a much larger number of catalyst pellets bridging across the top opening of the reactor tube, and illustrates catalyst bridging inside a reactor tube.

FIG. 2 is a schematic plan view of the upper tube sheet 12 of FIG. 1, including a plurality of reactor tubes 16 (and is identical to the lower tube sheet 14). As shown in FIG. 3, catalyst pellets 18 may bridge over the open top end of the reactor tube 16 when trying to load catalyst into the reactor tube 16, which prevents the pellets from entering into the reactor tube 16. This occurs when the inside diameter of the open top end of the reactor tube 16 is less than about four times the diameter of the pellets. FIG. 4 shows that the bridging situation is exacerbated as more catalyst pellets 18 are dumped on top of the tube sheet 12. Furthermore, if two or more pellets 18 fall into the top opening of the reactor tube at approximately the same time, the conditions are favorable for forming a bridge inside the reactor tube 16, as shown in FIG. 4, which creates a void or space below the bridged catalyst inside the tube 16, preventing the catalyst from completely filling the reactor tube 16 and resulting in a non-uniform and undesirable catalyst loading of the reactor tube 16.

Figure 5:
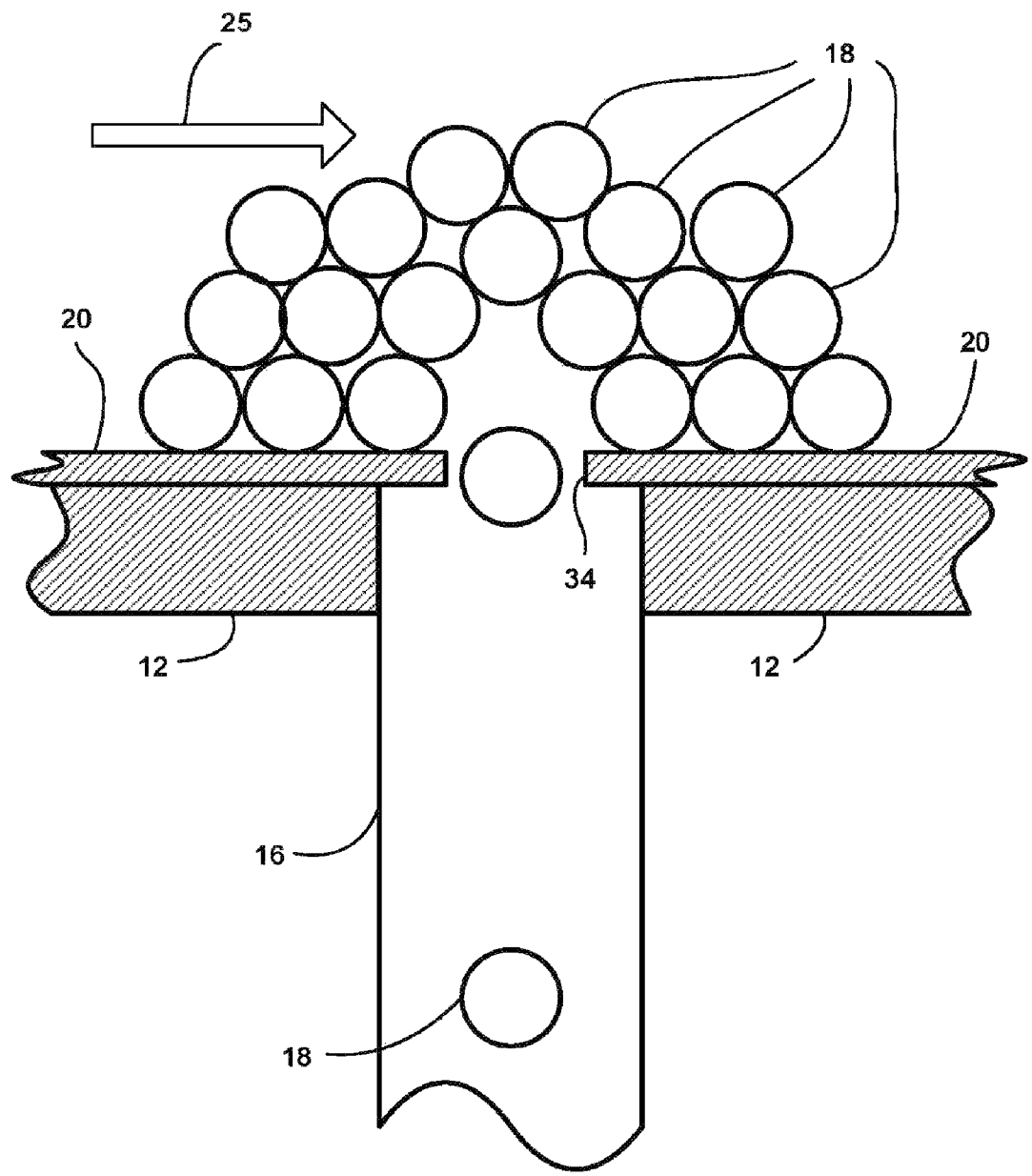
FIG. 5 is a broken away schematic section view, similar to FIG. 4, but with the addition of a template to aid in the dispensing of the catalyst pellets into the reactor tube.
Figure 5A:
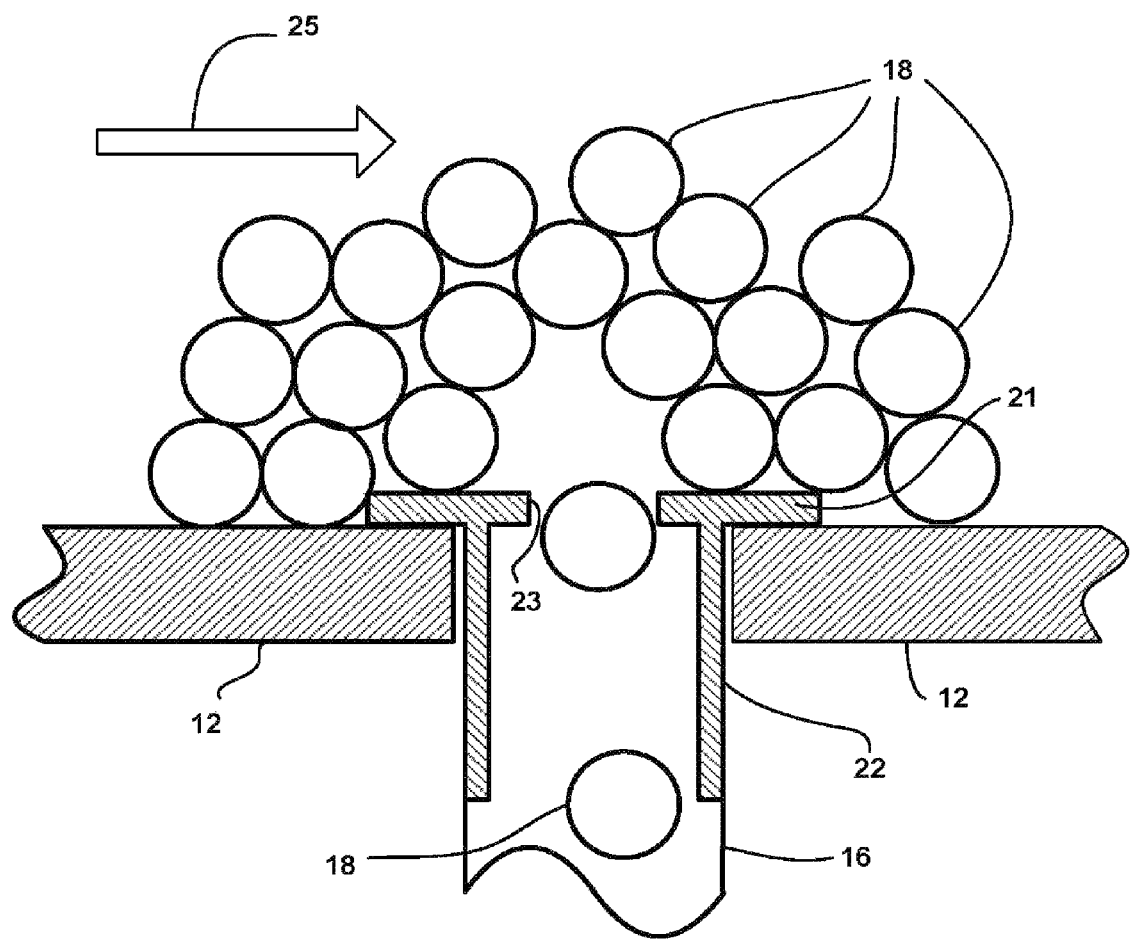
FIG. 5A is a broken away schematic section view, similar to FIG. 5, but using a loading sleeve instead of a template to aid in the dispensing of the catalyst pellets into the reactor tube.

To prevent bridging of catalyst pellets 18 inside the reactor tube 16, prior art devices have relied on templates 20 (as shown in FIG. 5) or loading sleeves 22 (as shown in FIG. 5A) which have smaller openings 34 (in FIG. 5) and 23 (in FIG. 5A) than the reactor tubes 16 and thereby restrict the flow of pellets 18 into the reactor tubes 16 so as to prevent bridging inside the tube 16. (i.e., if the pellets flow through the tube 16 in "single file" or few enough at a time that they cannot span the full diameter of the tube at any one time, bridging will not occur.) However, the catalyst pellets 18 still form natural bridges atop the template 20 or atop the loading sleeve 22. Operators sweep the mound of catalyst pellets 18, as depicted by the arrow 25 in FIGS. 5 and 5A, using gloved hands, paddles, brooms, rakes, and other such devices to break the bridging so that additional catalyst pellets 18 fall through the openings 34 in the template 20 (or through the openings 23 in the flanges 21 of the loading sleeves 22) and drop into the reactor tubes 16. This sweeping action is applied to substantially the entire mass of catalyst pellets 18 resting atop the template 20 or loading sleeves 22, causing many of the brittle catalyst pellets 18 to fracture and break into smaller particles and forming dust.

Figure 6A:
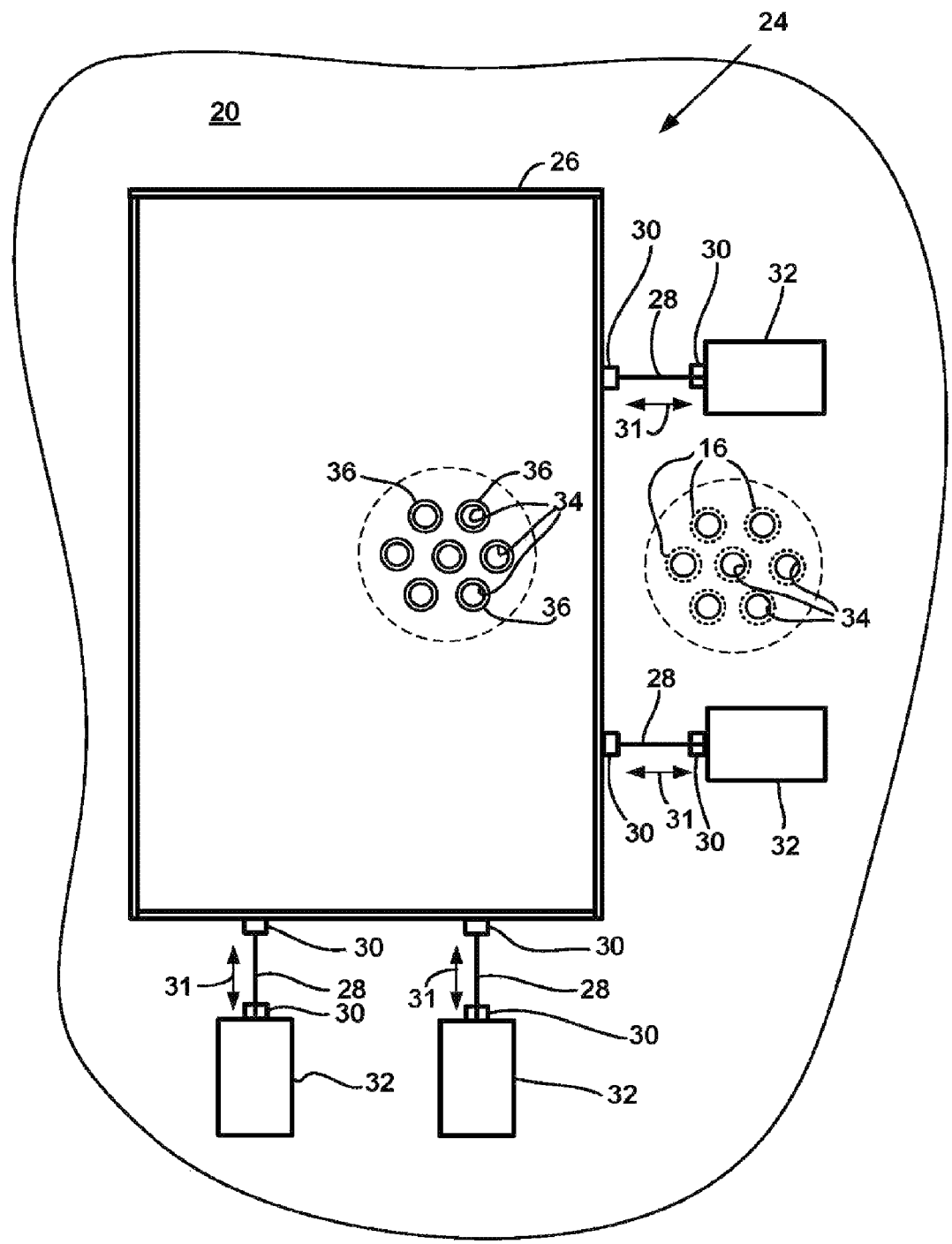
FIG. 6A is a broken away, schematic plan view of a device for dispensing catalyst mounted over a portion of the template.

FIGS. 6A-D and 7-10 show an arrangement including a first embodiment of a catalyst dispensing device 24 for loading catalyst into reactor tubes. The dispensing device 24 rests on top of a template 20, which rests on top of the upper tube sheet 12 of the reactor 10. On the right side of FIG. 6A are shown some of the openings 34 in the template 20, and, behind them in phantom are the open-top reactor tubes 16. While the drawing shows only some of those openings 34 and tubes 16, it is understood that the openings 34 and tubes 16 are distributed evenly throughout the template 20 and the upper tube sheet 12, respectively. (This may be better understood by looking at FIG. 11, which is a section view through the tray 26 only.) It should be noted that the openings 34 in the template 20 have a smaller diameter than the inside diameter of the reactor tubes 16 and are axially aligned with the tubes 16. The template 20 is a relatively thin plate body having horizontal, planar top and bottom surfaces and defining a plurality of holes extending from the top surface to the bottom surface. The bottom surface of the template 20 rests on top of the upper tube sheet 12 and may cover all or a portion of the upper tube sheet 12.

Figure 7:
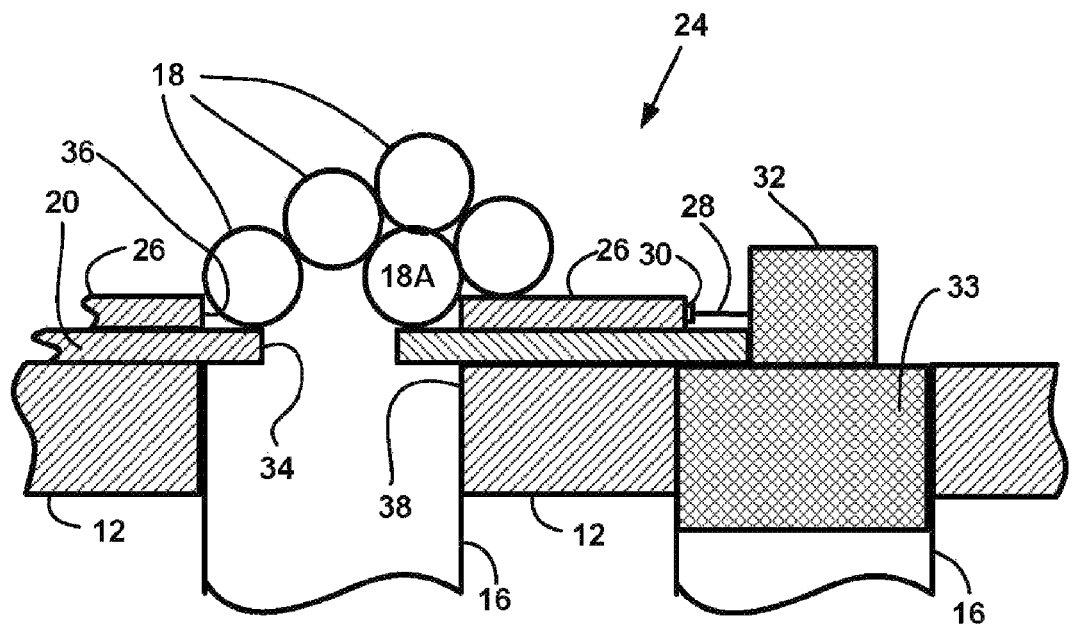
FIG. 7 is a broken away schematic section view, similar to that of FIG. 5, but including the dispensing device of FIG. 6A in the position shown in FIG. 6A, with catalyst pellets bridging above the top of the reactor tube.
Figure 8:
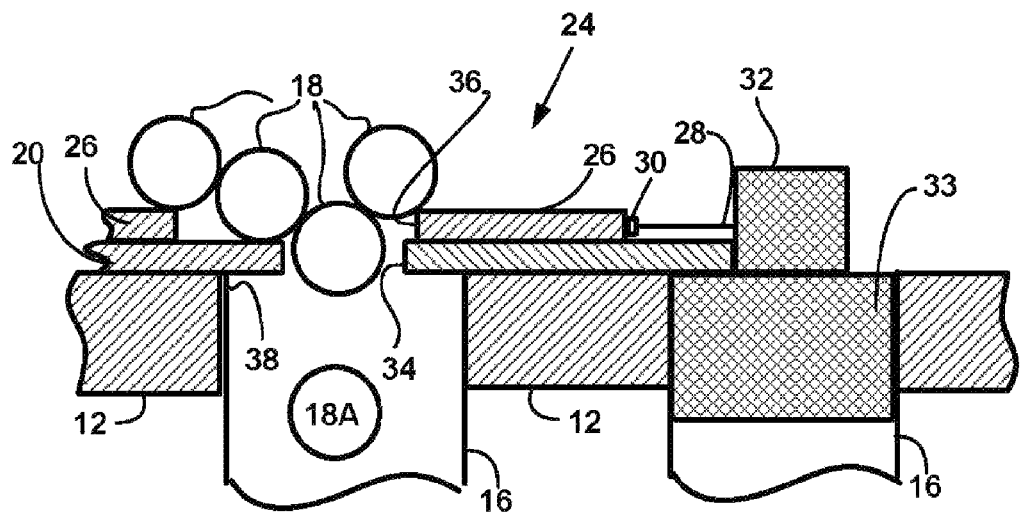
FIG. 8 is the same view as 7, but showing the dispensing device in the second position, shown in FIG. 6B so as to break the bridging of the catalyst pellets above the top of the reactor tube.
Figure 9:
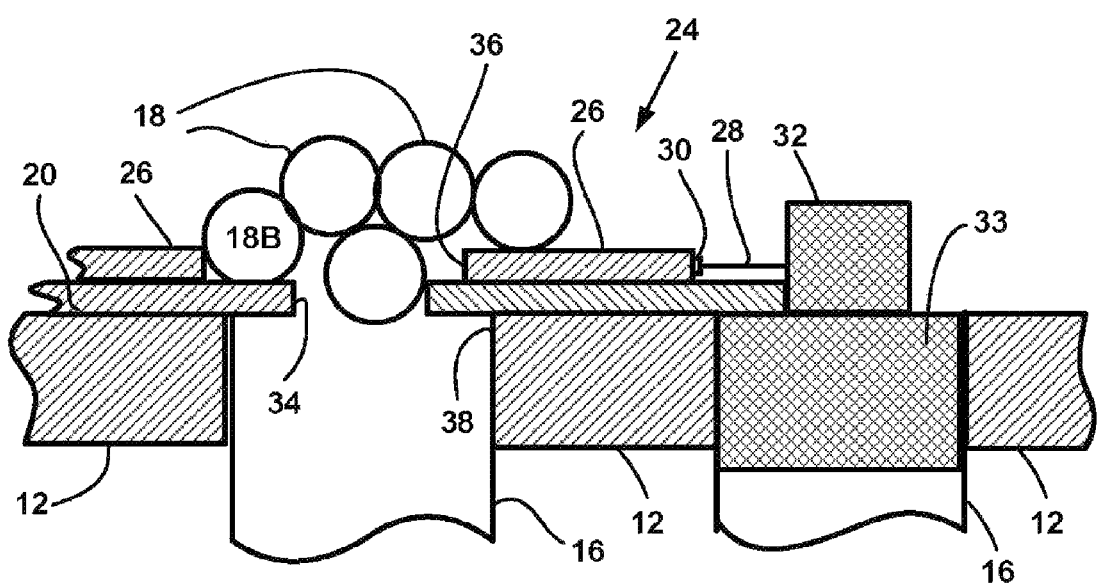
FIG. 9 is the same view as FIG. 8, but showing the dispensing device in a third position.

As best appreciated in FIG. 6A, the catalyst dispensing device 24 includes a tray 26, which serves as a hopper and is operatively connected, via connecting rods 28 and pivots 30 (pivot locations are located on the rod end and cap end of their respective cylinders), to four linear-motion drives 32, which are fixed in position by means of pins 33, which extend into reactor tubes 16, as shown in FIGS. 7-9. (They could extend into other openings in the tube sheet 12 or in the template 20, or be secured in position by other means, if desired.) The double headed arrows 31 indicate the direction of motion of the linear-motion drives 32. The pivots 30 at either end of each connecting rod 28 allow for misalignment in the connection between the linear-motion drives 32 and the tray 26 to permit the desired motion of the tray 26. The tray 26 moves substantially horizontally, along a plane which is parallel to the plane of the template 20 on which the tray 26 rests. The tray 26 includes means for holding a plurality of pellets and has a plurality of openings 36 through which the pellets must pass in order to flow from the tray into the respective vertical reactor tubes 16. The pellets also must pass through the openings 34 in the template 20 located below the tray 26 in order to flow into the respective reactor tubes 16.

Again, while only some of the openings 36 are shown, it is understood that the openings 36 are evenly distributed over the entire tray 26.

In an alternative arrangement, the catalyst dispensing device 24 may rest on top of the flanges 21 of a plurality of loading sleeves 22 (See FIG. 5A) instead of resting on top of the template 20. In that case, then the pellets also would pass through the openings 23 in the loading sleeves in order to flow into the respective reactor tubes 16.

As shown in FIGS. 6A-D and 7-9, the tray 26 of the catalyst dispensing device 24 is resting on top of the template 20. The openings 36 through the tray 26 are a bit larger than the corresponding openings 34 in the template 20, which permits the tray 26 to shift horizontally relative to the stationary template 20 without closing off any portion of the openings 34 in the template 20.

As shown in FIGS. 6A and 7, the openings 36 of the tray 26 are axially aligned with the openings 34 in the template 20, which, in turn, are axially aligned with the respective longitudinal axes of the reactor tubes 16. The template 20 lies between the tray 26 and the tube sheet 12. Some of the pellets 18 that are forming a bridge are in contact with the top surface of the template 20.

Figure 6B:
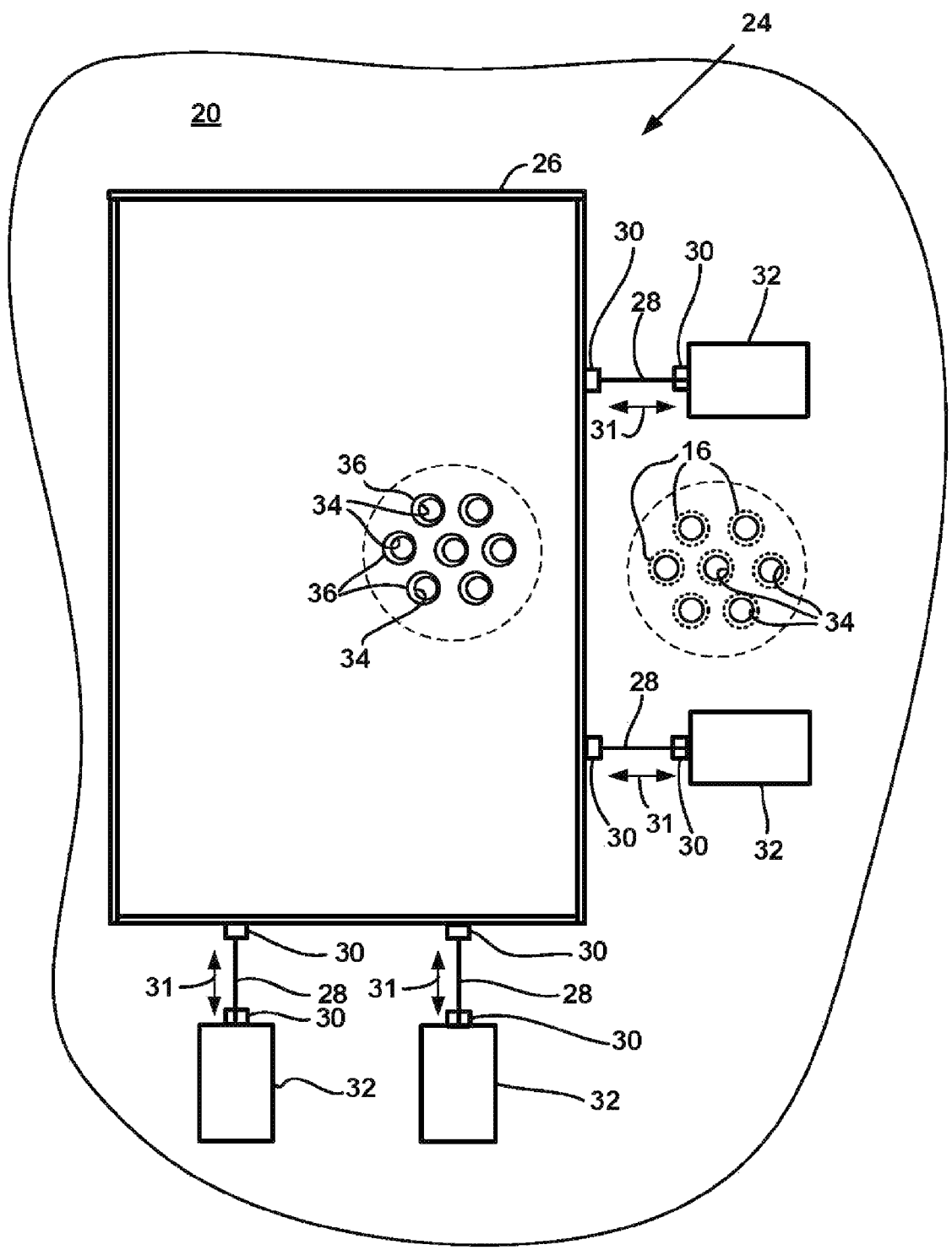
FIG. 6B is the same view as 6A, but with the device shifted to a second position.

As shown in FIGS. 6B and 8, the tray 26 has been shifted to the left, so the axes of the openings 36 in the tray 26 are to the left of the axes of their respective template openings 34 and reactor tubes 16. This position is achieved by the linear-motion drives 32 on the right hand side of the catalyst dispensing device 24 (as seen from the vantage point of FIGS. 6A-C) pushing the tray 26 to the left. This causes the vertical edge of the opening 36 in the tray 26 to contact the pellet 18A, which is resting on the top surface of the template 20 and push it to the left, into the opening 34 of the template 20, so that pellet 18A falls through the openings 36 and 34 and into the reactor tube 16. Since the pellet 18A was supporting the bridge adjacent to the opening 36, its movement relative to the other pellets 18 causes the bridge to fall and allows other pellets 18 to fall through the openings 36, 34 into the reactor tube 16 until another bridge is formed adjacent to the opening 36.

As the linear-motion drives 32 on the right hand side of the catalyst dispensing device 24 (as seen from the vantage point of FIGS. 6A-C) pull the tray 26 to the right while at the same time the linear-motion drives 32 on the bottom of the catalyst dispensing device 24 (as seen from the vantage point of FIGS. 6A-C) pull the tray 26 to the bottom, the larger through openings 36 of the catalyst dispensing device 24 are also shifted to the right and bottom, but are still in fluid communication with the respective top openings 38 of the reactor tubes 16 via the smaller through openings 34 of the template 20. This corresponds to FIGS. 6C and 9.

As was explained briefly above, it can be seen in FIG. 7 that a bridge has been formed above the reactor tube 16, and some of the catalyst pellets 18 are resting on the template 20 inside the opening 36 of the tray 26. When the tray 26 is shifted to the left, parallel to the template 20, the edge of the opening 36 of the tray contacts one or more of those pellets 18A, shifting them to the left as well, which breaks up the bridge and allows pellets 18 to fall through the opening 36 in the tray and through the opening 34 in the template 20 into the reactor tube 16 until another bridge forms adjacent to the opening 36 in the tray 26.

Shifting the tray 26 to the position of FIG. 9 causes the edge of the opening 36 to contact another pellet 18B, again shifting that pellet 18B to break up the bridge that it is supporting and allowing the pellets 18 to fall through the openings 36, 34 in the tray 26 and template 20, respectively, and into the open top 38 of the reactor tube 16 until another bridge is formed.

This movement of the tray 26 relative to the template 20 continues to push the supporting pellets out from under the bridge of pellets that they are supporting, thereby breaking up the bridges and allowing the pellets to flow into the reactor tubes 16 without causing any more jarring or abrading of the pellets than is needed to break up the bridging and allow the pellets to flow through the tray 26 into the reactor tubes 16.

Figure 6C:
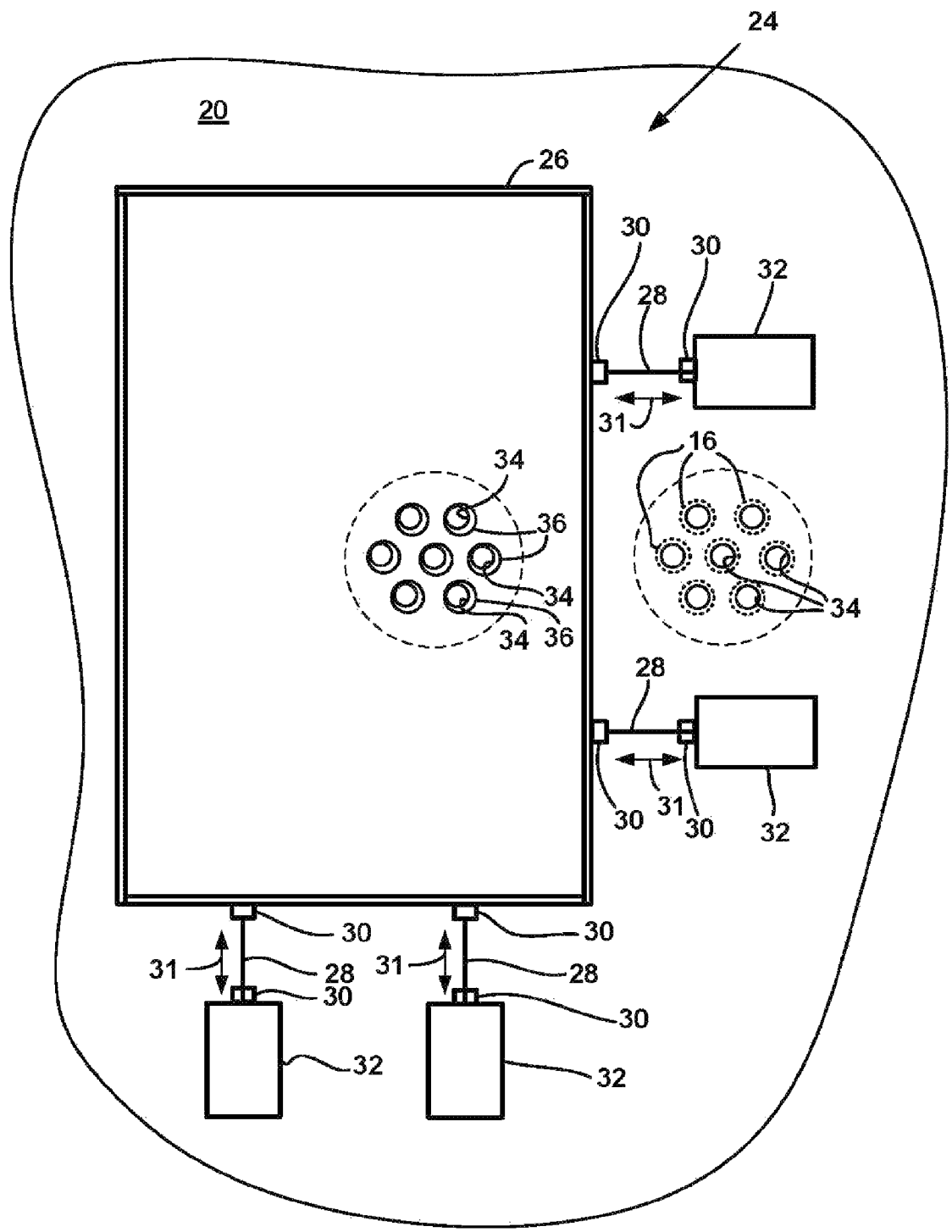
FIG. 6C is the same view as 6B, but with the device shifted to a third position.
Figure 6D:
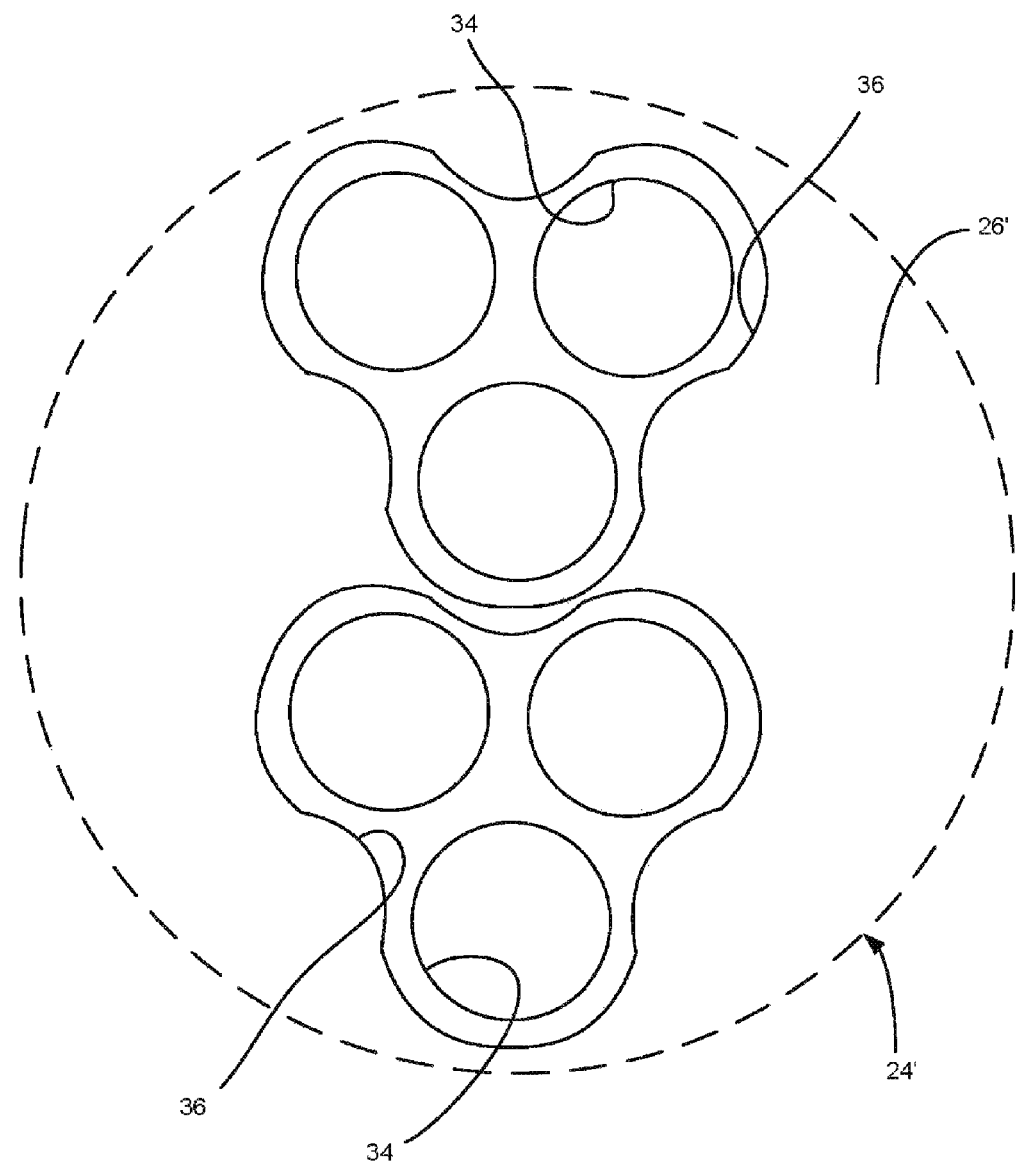
FIG. 6D is a broken away, plan view of a portion of the catalyst dispensing device of FIG. 6A, showing an alternate configuration for the openings in the dispensing tray.
Figure 10:
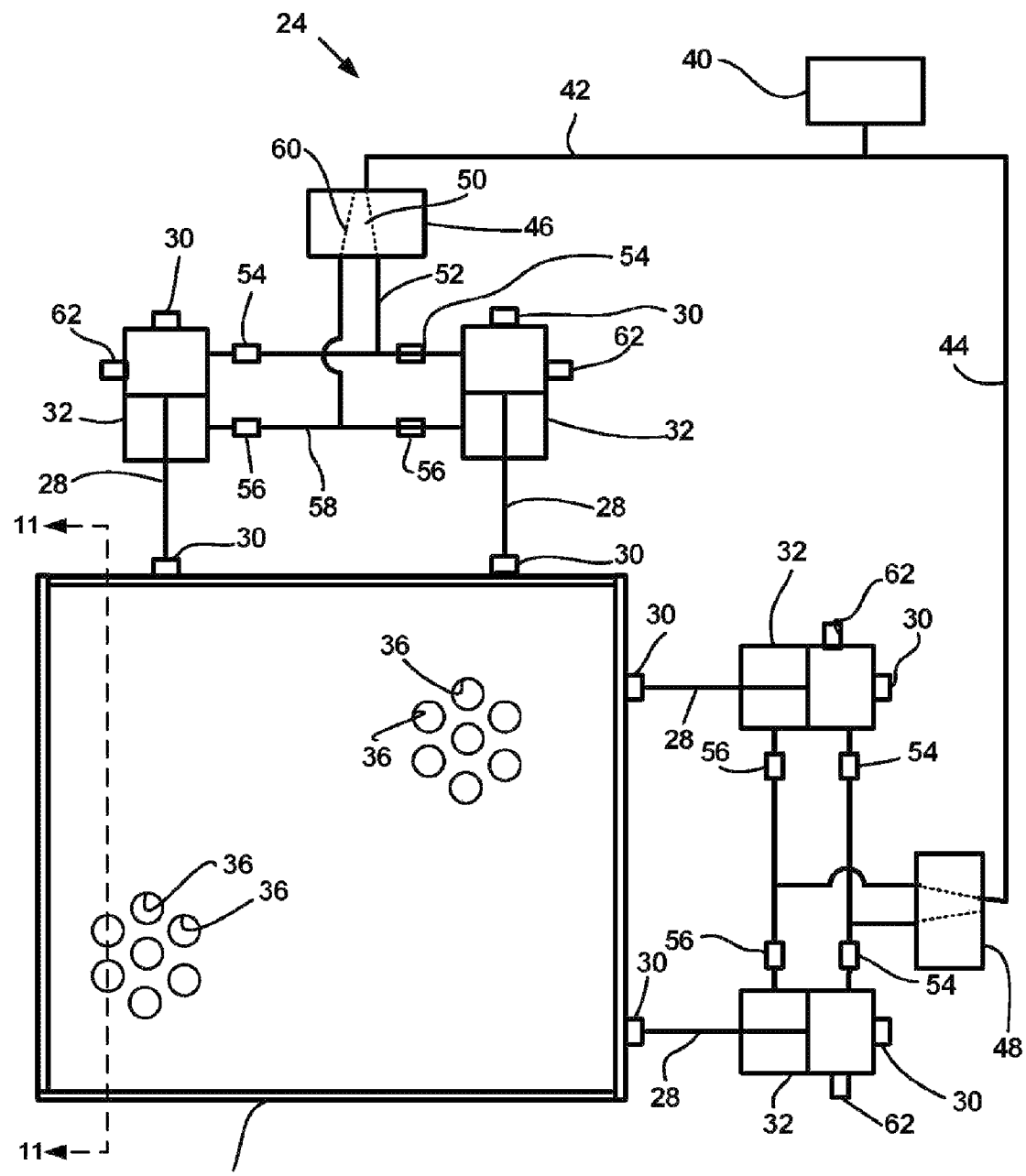
FIG. 10 is a schematic view of a pneumatic control arrangement for the dispensing device of FIGS. 6A-9.

FIGS. 12A-12H schematically depict some of the different paths which may be traced out by the tray 26, ranging from a circular clockwise orbit (FIG. 12A); a circular counter-clockwise orbit (FIG. 12B); quarter circle turns (ninety degrees) alternating clockwise and counterclockwise (FIG. 12C); shorter arcuate turns (such as 45 degrees) alternating clockwise and counterclockwise (FIG. 12D); quarter oval-shaped turns alternating clockwise and counterclockwise (FIG. 12E); rectangular orbits (FIG. 12F); star-shaped orbits (FIG. 12G); and hexagonal-shaped orbits (FIG. 12H). These different paths are just some of those which may be traced out by the tray 26, depending on the control scheme for the catalyst dispensing device 24. A possible control scheme is shown in FIG. 10 and described below. FIG. 6D depicts an alternate shape for the opening 36' in the tray 26' of the dispensing device 24', showing that these openings 36' need not be round (as shown in FIGS. 6A-6C) nor do they have to correspond on a one-to-one basis with the openings 34 in the template 20 (or in the loading sleeve 22). In this instance, the openings 36' are almost triangular in shape, with each opening 36' of the tray 26' opening into three openings 34 in the template 20.

The control system described in FIG. 10 involves driving the dispensing device 24 pneumatically. It includes four linear-motion pneumatic drives 32, each one connected to the tray 26 via its corresponding connecting rod 28. A pivot 30 at each end of each connecting rod 28 ensures that the connection point at the tray 26 may be misaligned from the connection point at the linear-motion drive 32 so as to permit the desired motion of the tray 26.

A source 40 of pressurized gas (such as compressed air) is in fluid communication, through piping 42, 44, with two multi-port solenoid valves 46, 48. Each solenoid valve 46, 48 is in turn in fluid communication with two linear-motion pneumatic drives 32 through a set of four flow control devices as described in more detail below.

The operation of the control scheme for the catalyst dispensing device 24 of FIG. 10 is described below with respect to one linear-motion drive 32 only, on the upper left hand corner of FIG. 10. It will be clear that the other drives 32 operate in essentially the same manner. The air source 40 provides compressed gas to the solenoid valve 46 via the line 42. The solenoid valve 46 sends the compressed air via the path 50 to the line 52 and through the flow control limiter 54 to the linear-motion drive 32 which pushes the connecting rod 28 outwardly (in the down direction as seen from the vantage point of FIG. 10). The air is exhausted through the flow control limiter 56 and through the line 58 back to the solenoid valve 46 which exhausts the air through the path 60. A proximity switch 62 on the linear-motion drive 32 sends a signal to a controller (not shown) when the linear-motion drive 32 has reached the end of its run. The controller actuates the solenoid valve 46, causing it to shift to a second position (not shown), which reverses the flow of compressed air to retract the connecting rod 28 on the linear-motion drive 32. The proximity switch 62 on the linear-motion drive 32 again sends a signal to the controller when the linear-motion drive 32 has once again reached the end of its run. The controller actuates the solenoid valve 46 which shifts and again reverses the flow of compressed air, and the entire cycle is repeated.

While air-operated drives 32 are described here, it is understood that the drives could be electric motors or other known drive means instead, and the control means would be suitable to control the drive means.

Operation of the Catalyst Dispensing Device

The catalyst dispensing device 24 is placed atop a template 20 wherein the through openings 34 on the template 20 are substantially axially aligned with the reactor tubes 16. Preferably the linear-motion drives 32 of the catalyst dispensing device 24 are secured to the template 20 or to the tube sheet 12 to prevent any relative movement between the linear-motion drives 32 and the template 20. Catalyst pellets 18 are dumped into the tray (hopper) area 26 of the catalyst dispensing device 24 which is then powered up to begin the catalyst dispensing process. The relative horizontal motion between the tray 26 and the template 20 breaks any bridges as they form, allowing the catalyst pellets 18 to fall through the respective upper opening 36 in the tray 26 and lower opening 34 in the template 20 and into the reactor tubes 16, as shown in FIGS. 6A-9.

It should be noted that during this process there is very little jostling and relative motion between the vast majority of the catalyst pellets 18 in the tray 26. When a local bridge is broken and a catalyst pellet 18 falls through the template 20 and into a reactor tube 16, any catalyst pellets 18 immediately above the collapsed bridge will collapse as well and flow into the tube 16 until a new bridge is formed. This new bridge is then broken by the relative motion between the tray 26 and the template 20, and the process is repeated continuously until the reactor tube 16 is fully loaded, or the tray 26 runs out of catalyst pellets 18, or the catalyst dispensing device 24 is powered off. Not only is there very little relative motion among the catalyst pellets 18 in the tray 26, which limits the erosion and breakage of the catalyst pellets 18 and the consequent dust generation, but the whole process is mechanized and needs very little operator attention.

Of course, as explained earlier, the catalyst dispensing device 24 may rest on top of the flanges 21 of a plurality of loading sleeves 22 (see FIG. 5A) instead of resting on top of the template 20, in which case the operation would be the same.

Note that it is the relative motion between the tray 24 and the underlying substrate (such as the surface of the template 20 or the surface of the flange of the loading sleeve 22) that imparts a direct mechanical force to at least one of the pellets 18 adjacent to the opening 36 that is different from the forces being applied to the other surrounding pellets 18 in order to break up the bridging adjacent to the opening 36, allowing catalyst pellets 18 to fall out of the tray 26, through the openings 36 and 34, and into the reactor tube 16. This process continues repeatedly, with successive bridge forming followed by bridge breaking to load the reactor tube 16 with catalyst pellets 18. The reactor tube 16 also serves as a conduit to direct the pellets to the desired delivery point.

Additional Embodiments of a Catalyst Dispensing Device

Figure 13:
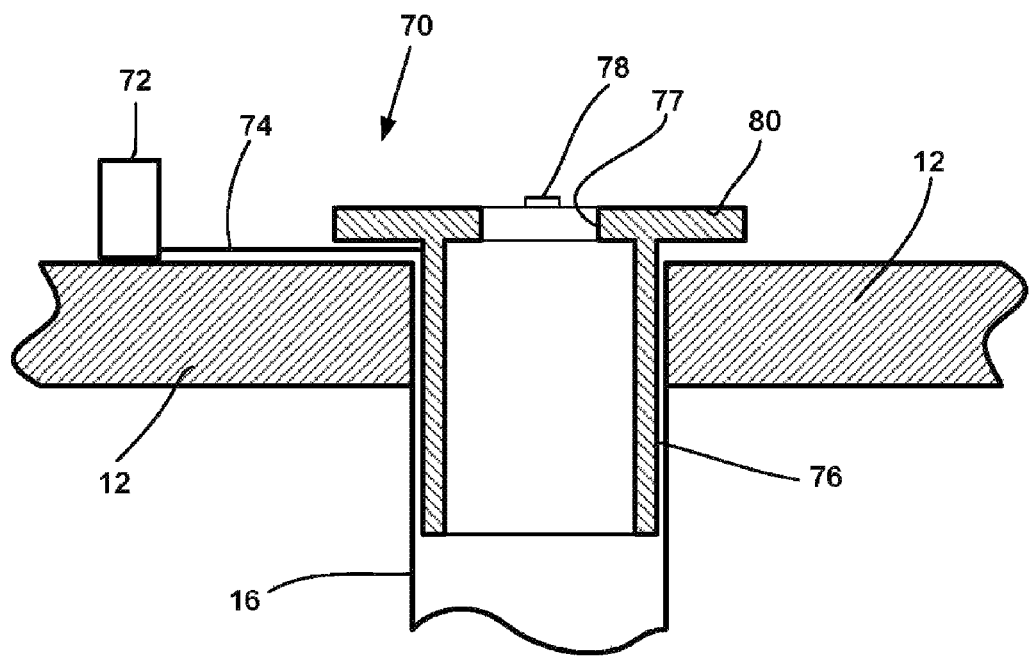
FIG. 13 is a broken away, section view of another embodiment of a dispensing device for dispensing catalyst, mounted on an upper tube sheet.
Figure 14:
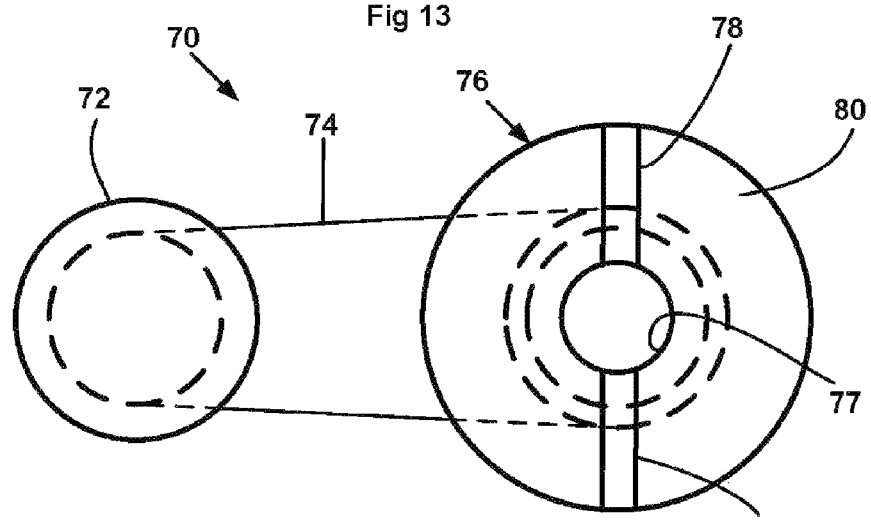
FIG. 14 is a plan view of the dispensing device of FIG. 13, with the tube sheet omitted for clarity.

FIGS. 13 and 14 show another embodiment of a catalyst dispensing device 70. Comparing this catalyst dispensing device 70 in FIG. 13 with the loading sleeve 22 of FIG. 5A, it may be seen that they are quite similar. The most obvious difference is that the catalyst dispensing device 70 is mechanically driven by a drive 72 via a belt 74. The drive 72 may be a rotary or articulating drive, and the belt 74 is a means for transferring the motion of the drive 72 to the loading sleeve 76 of the catalyst dispensing device 70, as best seen in FIG. 14. This means for transferring the motion of the drive 72 to the loading sleeve 76 may be accomplished by a variety of other means (not shown) such as a gear or a rod.

A less obvious difference is the presence of ridges 78 on the top surface of the flange 80 of the loading sleeve 76. This embodiment shows two ridges 78 (See FIG. 14) which extend radially from the opening 77 to the outer edge of the flange 80 and which are diametrically opposed from each other. While the ridges 78 are preferred, the flange 80 may have a roughened surface or other high friction surface that will cause a pellet 18 that is resting on the top surface of the flange 80 to move along with the flange 80.

As may be seen in yet another embodiment of a catalyst dispensing device 70\* in FIG. 16, the loading sleeve may have one or more such ridges 78, 78\*, as described in more detail later. The ridges 78, 78\* serve to enhance the frictional resistance between the flange 80 of the loading sleeve 76 and the catalyst pellets resting atop the flange 80 of the loading sleeve 76, such that the mechanical motion imparted by the drive 72 to the loading sleeve 76 is more readily transmitted to the catalyst pellets resting atop the flange 80 so as to promote the breaking of any catalyst bridge.

In this embodiment, the drive 72 imparts a rotary motion to the loading sleeve 76 of the catalyst dispensing device 70, causing the flange 80 of the loading sleeve 76 to rotate in a horizontal plane, parallel to the top of the tube sheet 12, rotating slowly about its longitudinal axis, which is a vertical axis, aligned with the vertical axis of the reactor tube 16. As it does so, the catalyst pellets 18 resting directly on top of the flange 80 travel with the flange 80, so the flange 80 imparts a direct mechanical force to the pellets 18 resting on top of it, causing them to move relative to the other surrounding pellets 18 above them, which breaks up any catalyst bridges that may form just above the reactor tube 16. In this case, the tube sheet 12 and the wall of the reactor vessel serve as a hopper to provide means for holding a plurality of pellets above the vertical reactor tube 16. The opening 77 in the flange 80 has a smaller diameter than the inside diameter of the reactor tube 16, and the pellets pass through the opening 77 to flow through from the holding means into the reactor tube 16.

Figure 15:
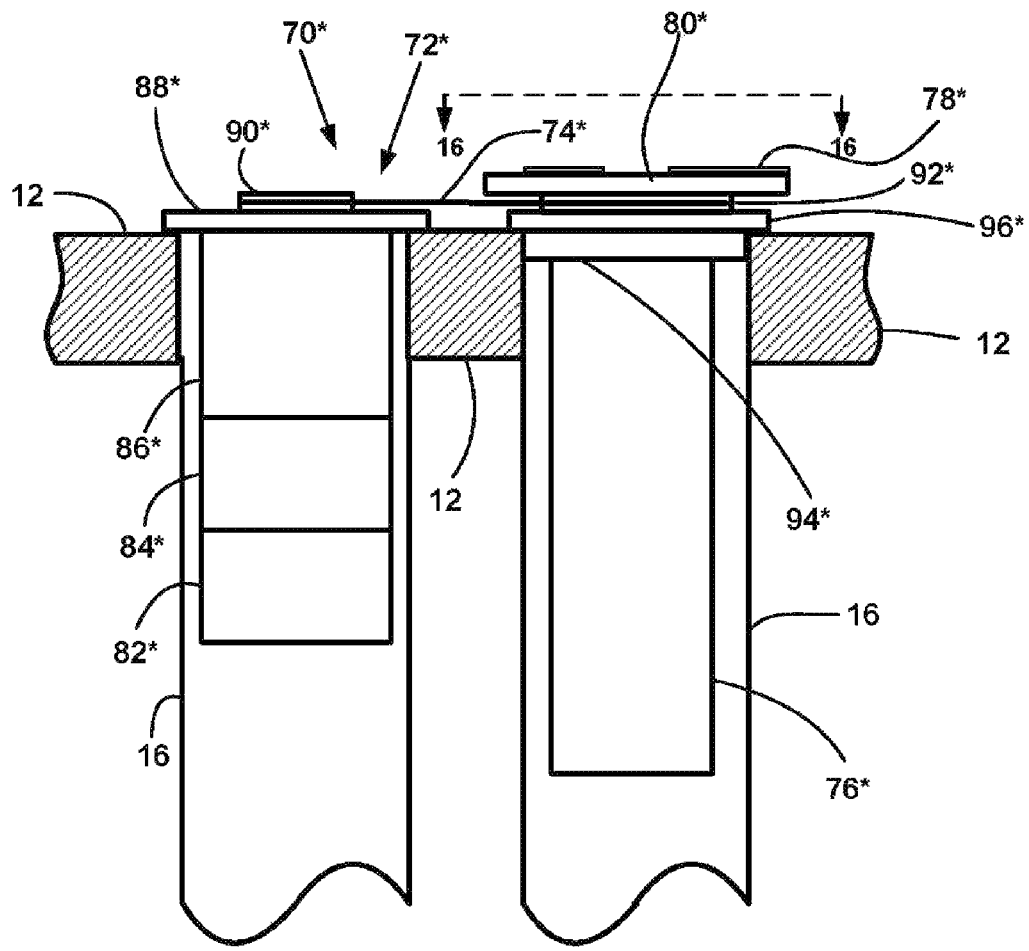
FIG. 15 is a broken away view, partially in section, of another embodiment of a device for dispensing catalyst.
Figure 16:
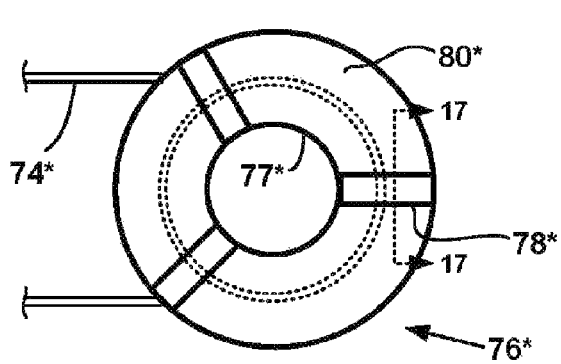
FIG. 16 is a view taken along line 16-16 of FIG. 15.
Figure 17:
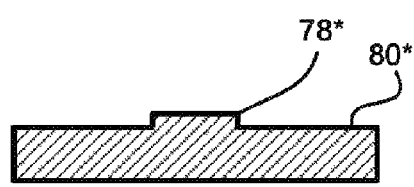
FIG. 17 is a view taken along line 17-17 of FIG. 16.

FIGS. 15-17 depict yet another embodiment of a catalyst dispensing device 70\*. This is similar to the catalyst dispensing device 70 of FIGS. 13 and 14, except that the drive 72\* is anchored and substantially enclosed by an adjacent reactor tube 16.

In FIG. 15, only the tube sheet 12 is shown in section. The drive 72\* includes a battery 82\*, a motor 84\*, and a gearbox 86\*, all of which are suspended inside a reactor tube 16 by the flange 88\* which rests atop the tube sheet 12. A pulley 90\* is engaged by the belt 74\* which in turn engages and drives a similar pulley 92\* on the loading sleeve 76\*. In this embodiment of a catalyst dispensing device 70\*, the loading sleeve 76\* includes a bearing housing 94\* and a bearing 96\* to minimize frictional resistance to rotation of the loading sleeve 76\* in the reactor tube 16.

The flange 80\* on the loading sleeve 76\* defines a plurality of ridges 78\* (See also FIGS. 16 and 17). As the drive 72\* rotates the loading sleeve 76\*, the flange 80\* imparts a direct mechanical force to the pellets resting on it, causing those pellets to shift relative to the rest of the pellets in the bridge, and thereby breaking up any bridging of pellets adjacent to the opening 77\* in the flange 80\* so the pellets 18 can flow through the opening 77\* and into the reactor tube 16.

Figure 18:
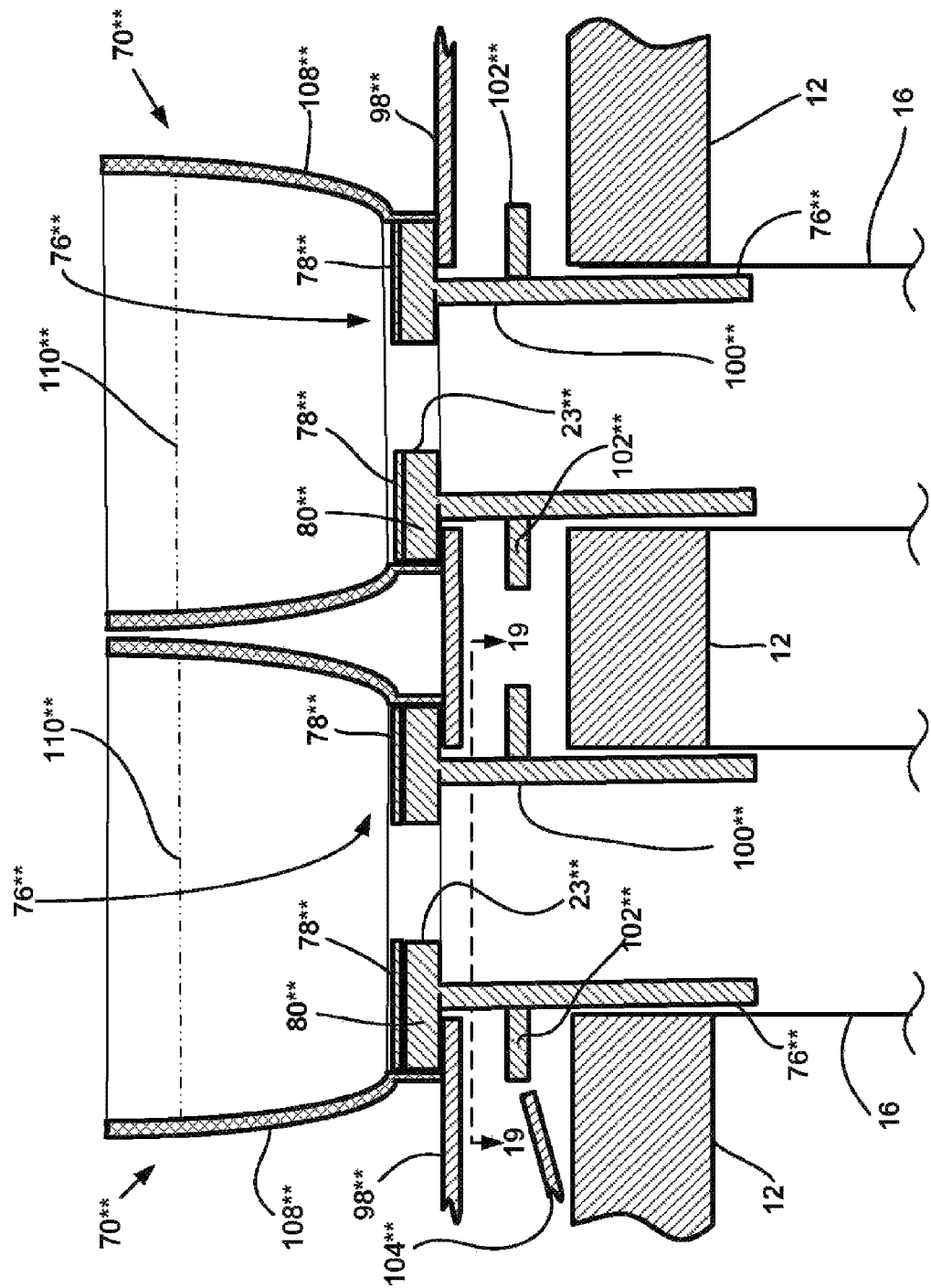
FIG. 18 is a broken away section view of another embodiment of a dispensing device.

FIG. 18 depicts yet another embodiment of a catalyst dispensing device **70\*\*. In this embodiment, the catalyst dispensing device 70\*\* includes two loading sleeves 76\*\* (though one or more such loading sleeves 76\*\* may be present) which are similar to the loading sleeve 76 of FIGS. 13 and 14 in that they includes ridges 78\*\*. This catalyst dispensing device 70\*\* rests on top of an elevated stationary template or frame 98\*\* which has a top surface that lies on a plane which is parallel to the plane of the top surface of the tube sheet 12, but which provides some clearance between the frame 98\*\* and the tube sheet 12. The loading sleeve 76\*\* has its flange portion 80\*\* resting on top of the frame 98\*\*, while its tubular "leg" portion 100\*\* extends through the frame 98\*\*, through the space between the frame 98\*\* and the tube sheet 12, through the tube sheet 12, and into the reactor tube 16. The flange 80\*\* defines an opening 23\*\* that has a smaller diameter than the inside diameter of the reactor tube 16, again in order to regulate the flow of catalyst particles into the reactor tube 16 to prevent bridging within the tube 16**.

Figure 19:
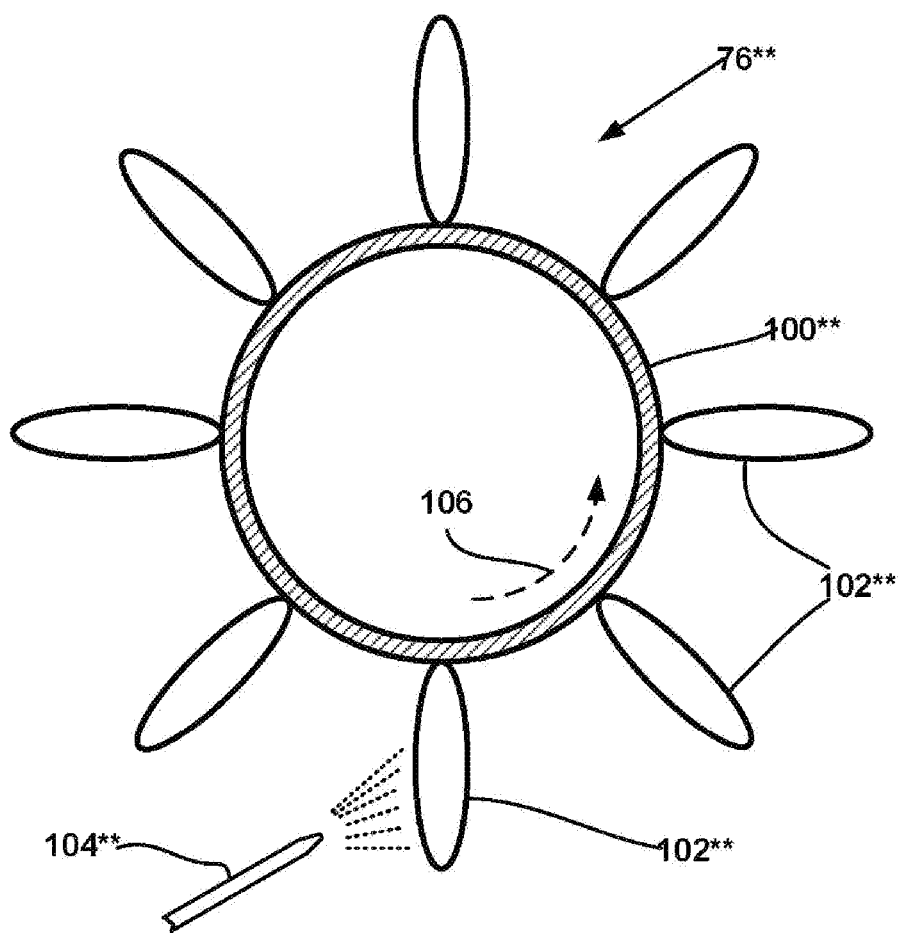
FIG. 19 is a view taken along line 19-19 of FIG. 18.

Mounted to the leg portion **100\*\* of the loading sleeve 76\*\*, and in the space between the frame 98\*\* and the tube sheet 12, are blades 102\*\* (See also FIG. 19), similar to the blades of a blower fan. A compressed air nozzle 104\*\* is mounted to the frame 98\*\*. As seen in FIG. 19, as the compressed air from the air nozzle 104\*\* blows on the blades 102\*\* of the loading sleeve 76\*\*, it applies a force causing the loading sleeve 76\*\* to rotate in the direction of the arrow 106. The compressed air from the air nozzle 104\*\* may blow continuously or it may blow intermittently to cause the loading sleeve 76\*\* to spin about its longitudinal axis, and as it does so, it imparts a direct mechanical force to the pellets 18 resting on top of the flange 80\*\* of the loading sleeve 76\*\* which moves the catalyst pellets 18 resting directly atop the flange 80\*\* relative to other pellets 18 that may be forming a bridge adjacent to the opening 23\*\* in the flange 80\*\* to break up any catalyst bridges, allowing catalyst to fall through the opening 23\*\* in the loading sleeve 76\*\***.

FIG. 18 also shows a funnel-like container or hopper **108\*\* directly above the loading sleeve 76\*\*, which provides means for holding a plurality of pellets 18. This container 108\*\* may include a mark 110\*\* corresponding to a preset volumetric dispensing of catalyst inside a reactor tube. In this embodiment, the funnel-like container 108\*\* does not rotate with the loading sleeve 76\*\*, but remains stationary, resting on the stationary frame 98\*\***. This embodiment may be particularly useful for partial loading of reactor tubes, such as when reactor tubes are loaded with different types of catalyst to different heights within the reactor tubes.

Figure 20:
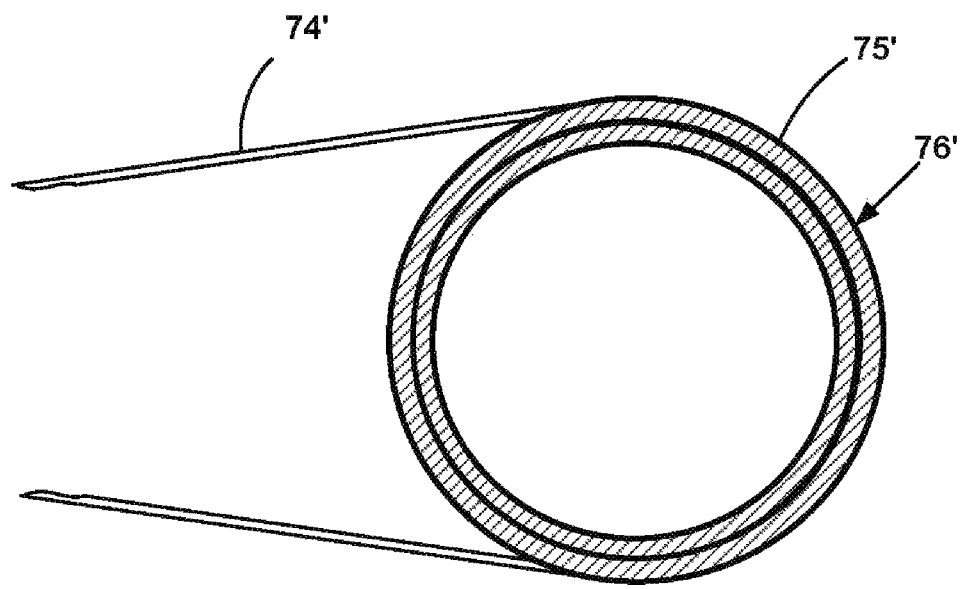
FIG. 20 is view similar to FIG. 19, but for another embodiment of a dispensing device.

FIG. 20 is a view similar to FIG. 19, but for yet another embodiment of a catalyst dispensing device. This catalyst dispensing device is essentially identical to the catalyst dispensing device **70\*\* of FIG. 18, except that it has a different mechanism for rotating the loading sleeve 76'. In this instance, the loading sleeve 76' is rotated by means of a drive (not shown) similar to the drive 72 of FIGS. 13 and 14, via a belt 74' and a pulley 75'**. Of course, other drive means, such as gears or rods, may be used instead of a belt.

Each loading sleeve **76\*\* in FIG. 18 (or 76' in FIG. 20) may be individually driven, or several may be tied together to a common drive. For instance, the belt 74' in FIG. 20 may wind over a number of pulleys 75' of different loading sleeves 76'. Likewise, the air nozzle 104\*\* may be fed by a common compressed air line manifold which supplies air to a plurality of air nozzles which blow air on other catalyst dispensing devices 70\*\***.

Figure 22:
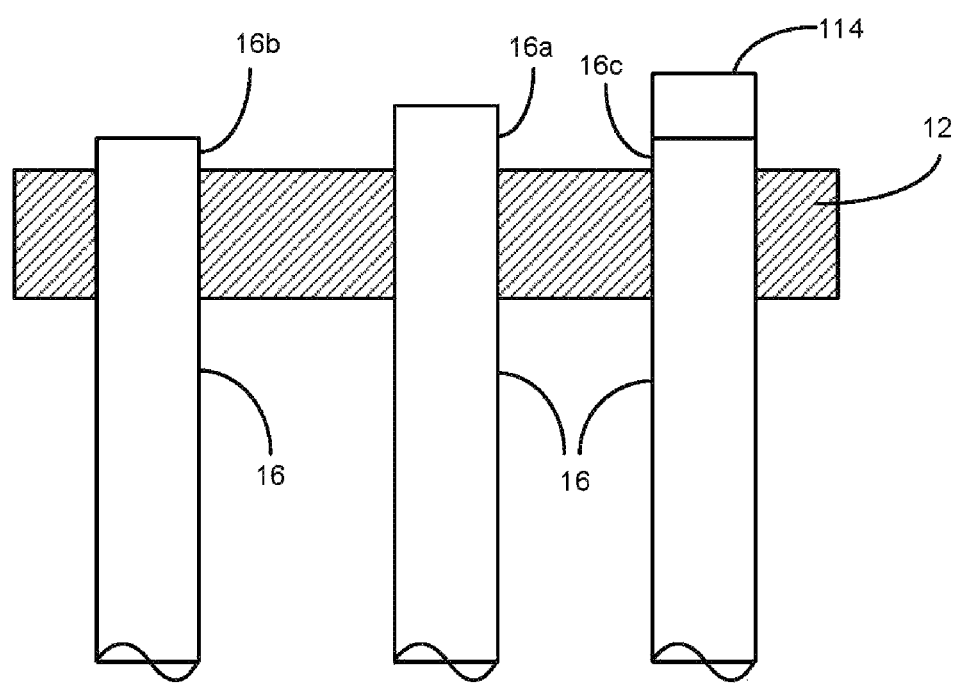
FIG. 22 is a broken away section view of the tube sheet, similar to FIG. 3, except showing three tubes, each having a different height relative to the tube sheet.

It sometimes occurs that the top tube sheet 12 in a reactor vessel is not completely flat. Sometimes it is very slightly domed and often, as shown in FIG. 22, the reactor tubes 16 project upwardly beyond the top tube sheet 12, with some tubes projecting upwardly more than other tubes. In FIG. 22, the upper portion 16A projects upwardly more than the upper portion 16b. Some tubes may have a plug 114 secured to the top portion, as shown with the top portion 16c, which causes the tube to project even a greater distance above the tube sheet 12.

Figure 21:
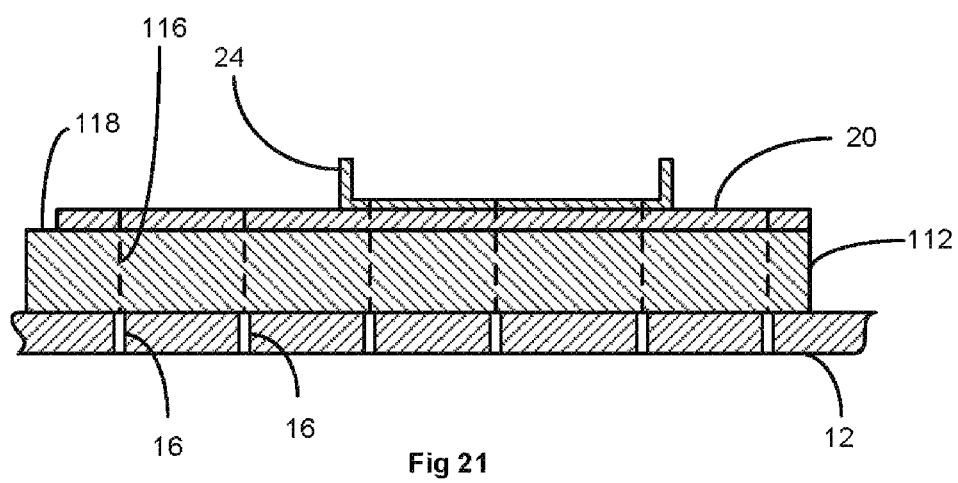
FIG. 21 is the same view of a dispensing tray as in FIG. 11 but showing an alternate arrangement mounted on a tube sheet and including a spacer between the dispensing device and the tube sheet.

FIG. 21 shows a solution to the problem of an uneven tube sheet 12, whether because the tube sheet 12 is slightly domed or because the tubes 16 project upwardly and unevenly from the tube sheet 12. In this instance, a spacer 112 is installed between the tube sheet 12 and the template 20 (or it could be between the tube sheet 12 and the loading sleeves 22 of FIG. 5A). This spacer 112 is preferably made of a foam material which adapts its shape to conform to the dome shape of the tube sheet 12. The spacer 112 has through openings 116 which are aligned with the reactor tubes 16 in the tube sheet 12. These openings 116 are large enough to accommodate any tube projections above the tube sheet 12 such that the top surface 118 of the spacer 112 is substantially flat despite any unevenness in the tube sheet 12 and its reactor tubes 16.

Figure 23:
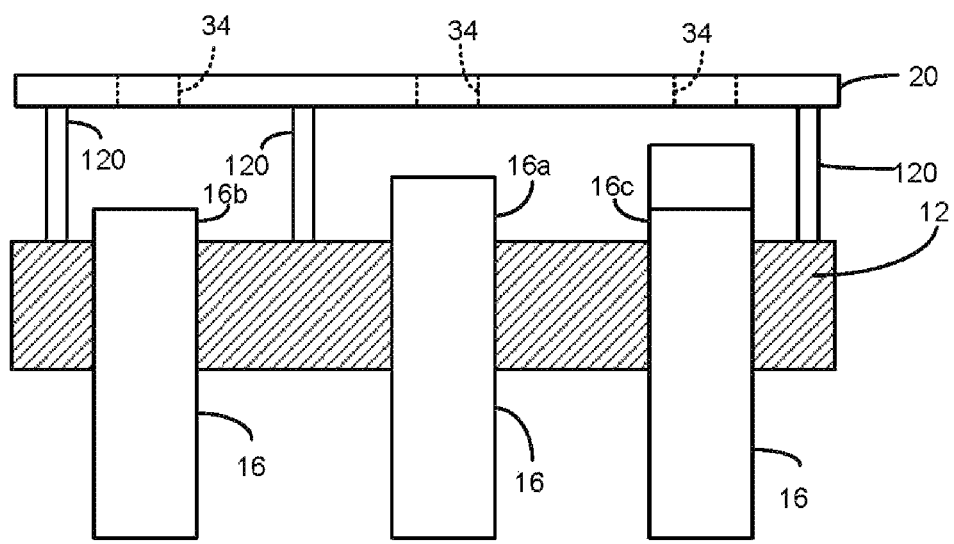
FIG. 23 is a side view of dispensing device like that of FIG. 11 or 21, but including a spacer to accommodate the varying tube heights of FIG. 22.

FIG. 23 shows an alternate solution to the problem of an uneven tube sheet 12. In this instance, the template 20 is supported above the tube sheet 12 via a plurality of legs 120, with the openings 34 in the template 20 substantially vertically aligned with the top openings of the reactor tubes 16.

Figure 24:
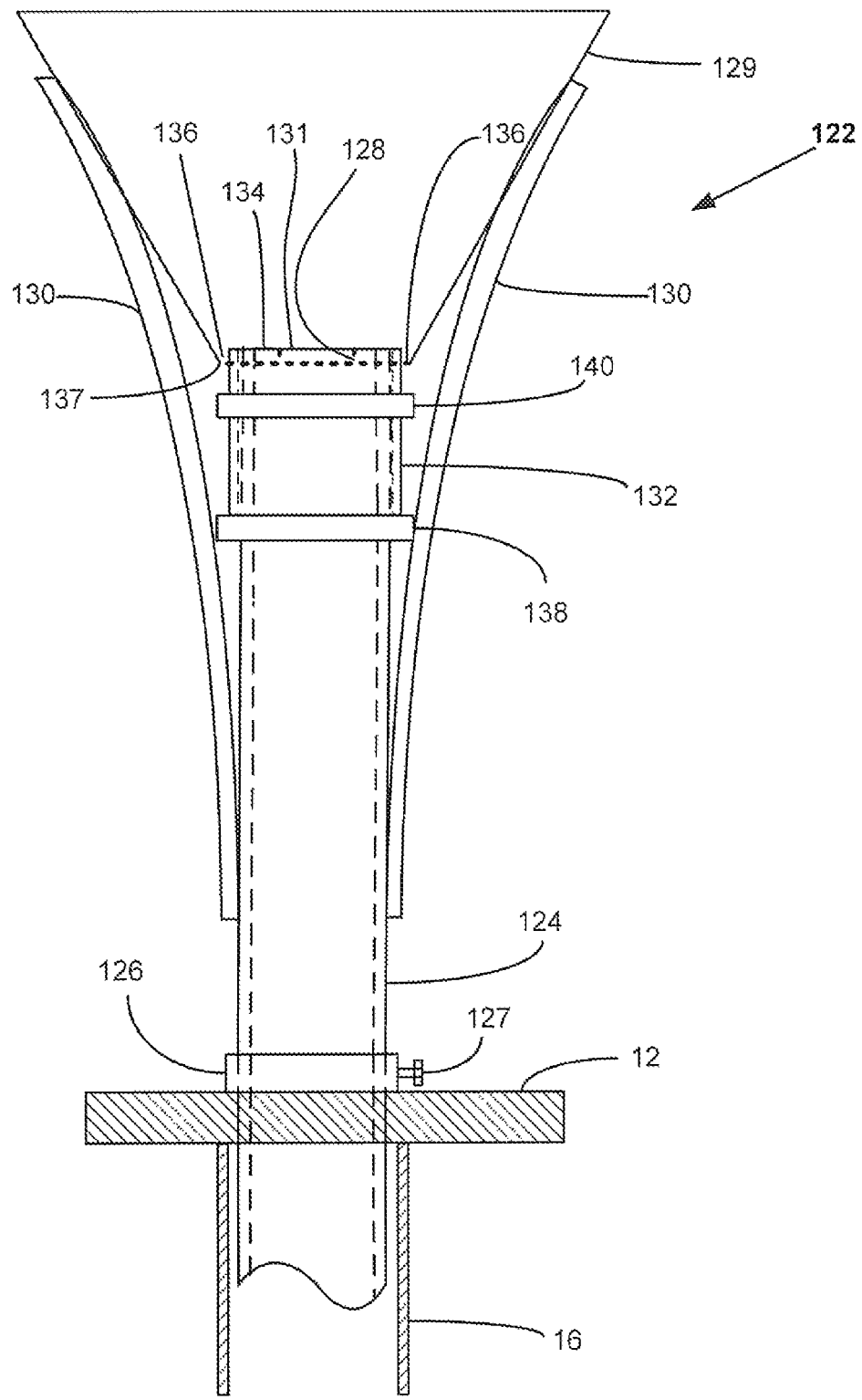
FIG. 24 is a side view of an alternate embodiment of a catalyst dispensing device, shown in a first, lowered position.
Figure 25:
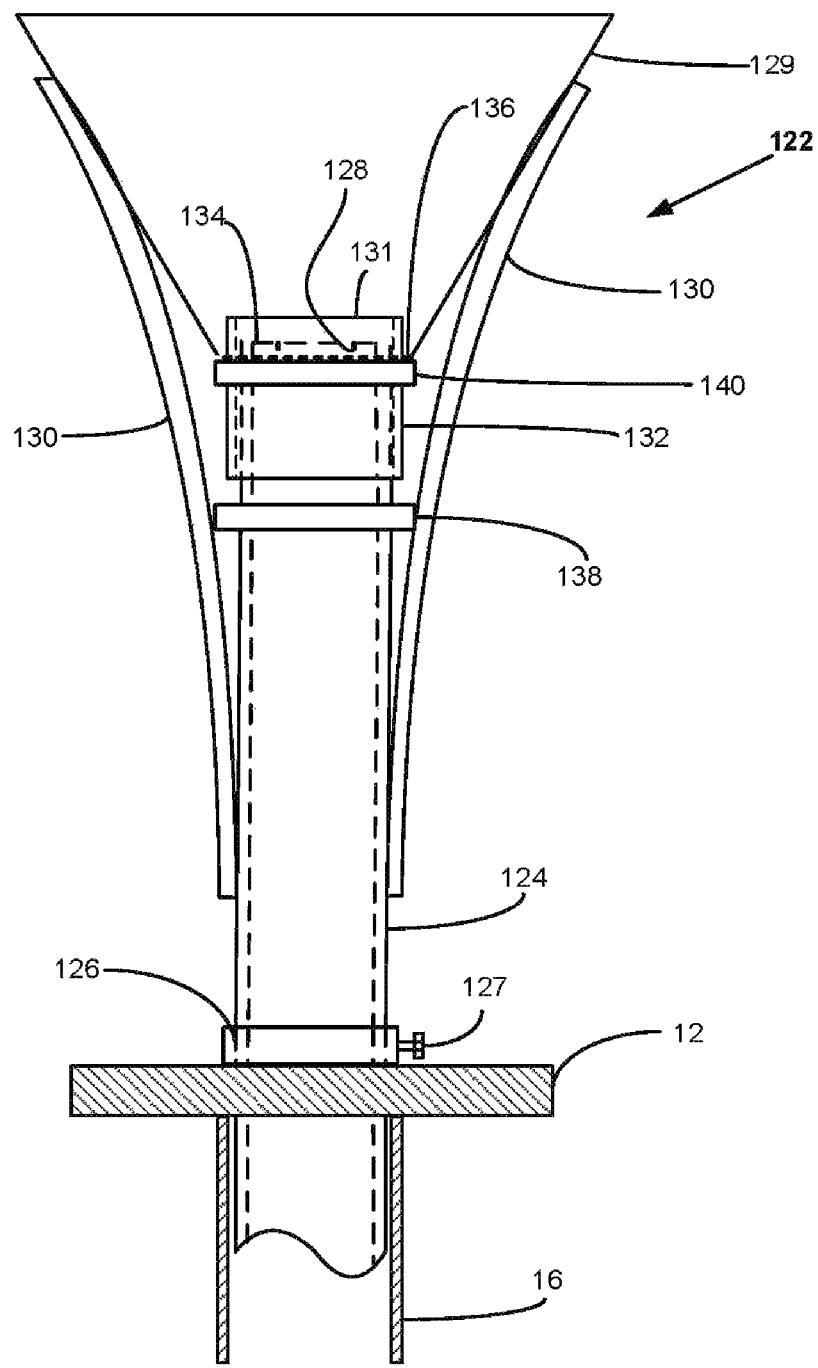
FIG. 25 is a side view of the dispensing device of FIG. 24, shown in a second, raised position.

FIGS. 24 and 25 show another embodiment of a catalyst dispensing device 122. This catalyst dispensing device 122 is similar to a loading sleeve, such as the loading sleeve 22 of FIG. 5A in that it includes tubular vertical leg 124, a portion of which slides into the top of a reactor tube 16. It also includes a flange 126 which supports the catalyst dispensing device 122 on the top surface of the tube sheet 12, and it has a through opening 128 at the top of the vertical leg 124 with a small enough diameter to restrict the flow of catalyst particles into the vertical leg 124 and into the reactor tube 16 so as to prevent possible bridging inside the vertical leg 124 and the reactor tube 16.

The catalyst dispensing device 122 includes a funnel shaped container 129 which provides means for holding a plurality of pellets above the reactor tube. This funnel 129 is attached to, and supported by, the vertical leg (or conduit) 124 of the loading sleeve by a plurality of arched stringers 130. This arrangement allows a narrow annular clearance 136 between the top edge 134 of the vertical leg 124 and the bottom opening 136 of the funnel 129, which is just wide enough for a movable sleeve 132 to fit between the vertical leg 124 and the funnel 129 and to shift up and down, as explained in more detail below.

The movable sleeve 132 has an inside diameter which is just slightly larger than the outside diameter of the vertical leg 124 of the loading sleeve and an outside diameter that is just slightly smaller than the inside diameter of the bottom edge 137 (See FIG. 24) of the funnel 129. A lower stop band 138 is secured to the outside surface of the vertical leg 124 to provide a lower stop for the movable sleeve 132, as shown in FIG. 24. An upper stop band 140 is secured to the outside surface of the movable sleeve 132 to provide an upper stop for the movable sleeve 132, as shown in FIG. 25, wherein the upper stop band 140 impacts against the bottom of the funnel 129 to stop the movable sleeve 132 at its upper limit.

It may be appreciated that, when the movable sleeve 132 is in its lowest position, as shown in FIG. 24, the top edge 131 of the movable sleeve 132 is substantially flush with the top edge 134 of the vertical leg 124. However, when the movable sleeve 132 is moved to its raised position as shown in FIG. 25, the top edge 131 of the movable sleeve 132 projects above the top edge 134 of the vertical leg 124 and into the funnel area itself. This slight vertical movement of the movable sleeve 132 relative to the top edge 134 of the vertical leg 124 imparts a direct mechanical force to the pellets 18 adjacent to the opening 128 that is different from forces being applied to the surrounding pellets in order to break up any bridging that may occur within the funnel 129 adjacent to the opening 128.

To use the catalyst dispensing device 122, the leg 124 of the loading sleeve is inserted into a reactor tube 16 until the flange 126 is resting on top of the tube sheet 12. Note that the flange 126 may be adjusted vertically along the vertical leg 124, as desired by loosening the adjustment screw 127, shifting the flange 126 to the desired position, and then tightening the adjustment screw 127. Catalyst particles (not shown) are added to the funnel 129, and the movable sleeve 132 is moved up and down to continuously break any bridge forming adjacent to the opening 128 of the loading sleeve. The movable sleeve may be moved manually or by some type of automated mechanism as described with respect to the dispensing device 122\* of FIG. 36. This process continues repeatedly, with successive bridges forming and then followed by bridge breaking to load the reactor tube 16 with catalyst pellets. As is explained below with respect to another embodiment of a catalyst dispensing device 122\* (See FIG. 36), the vertical movement of the movable sleeve 132 may be mechanized to automate the dispensing of catalyst into the reactor tubes 16.

FIGS. 36-40 show another embodiment of catalyst dispensing device 122\*. It is similar to the catalyst dispensing device 122 of FIG. 24 in that it has a funnel 129\*, a flange 126\*, a vertical leg (or conduit) 124\*, a stop 138\*, and a through opening 128\* (See FIG. 37) at the top of the vertical leg 124\* which has a small enough diameter to ensure that the flow of catalyst particles is restricted enough to prevent bridging in the leg 124\* and in the reactor tube 16.

Figure 37:
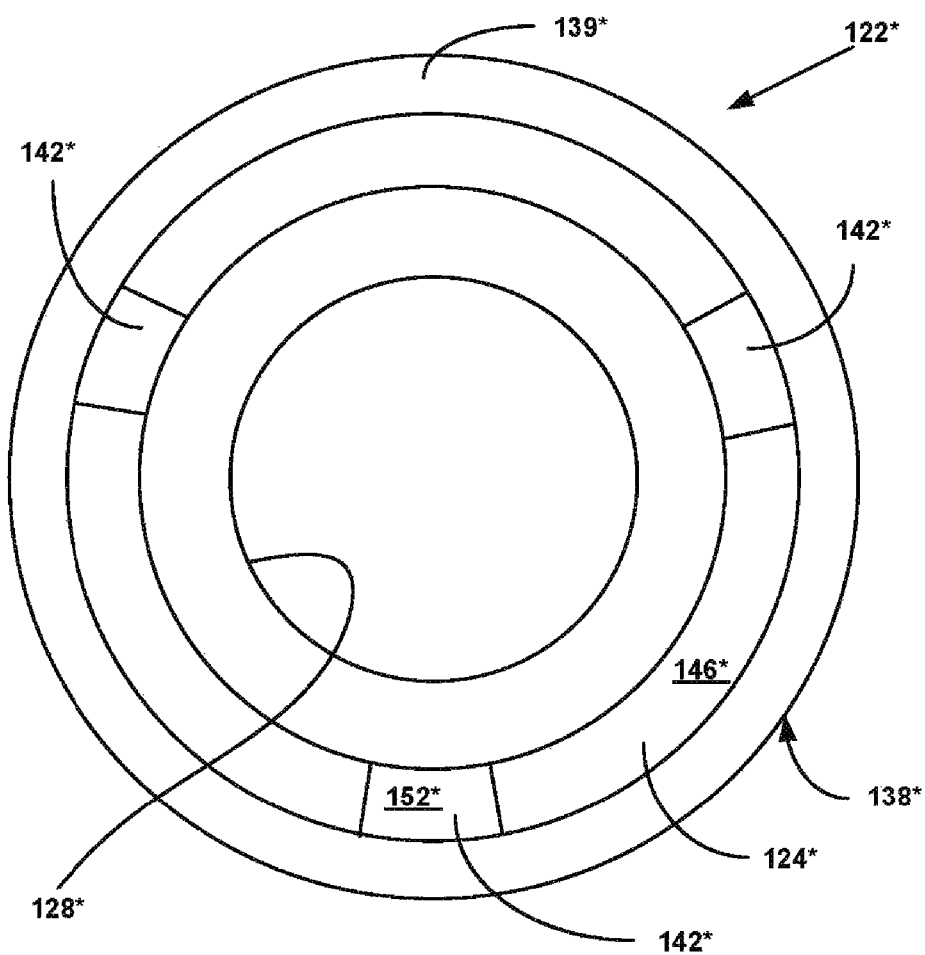
FIG. 37 is a view along line 37-37 of FIG. 36.
Figure 38:
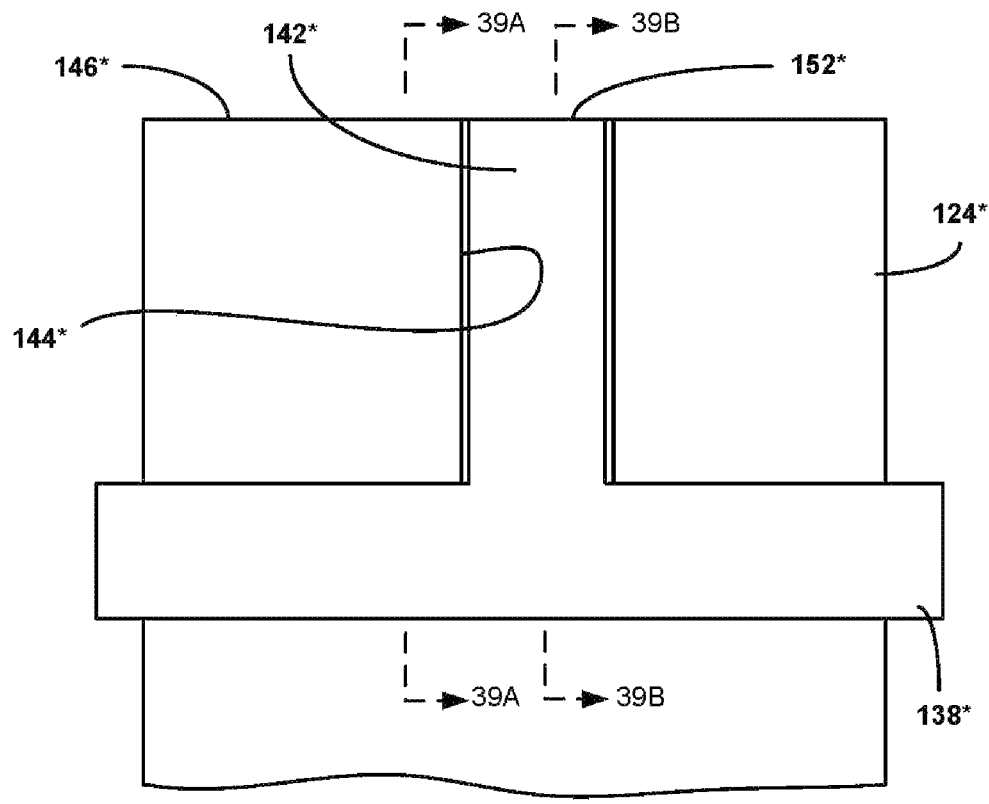
FIG. 38 is a broken away, side view, along line 38-38 of FIG. 36.

Referring to FIGS. 37, 38, 39A, and 39, the stop 138\* is actually a sleeve or collar which includes a ring 139\* with three upwardly and inwardly projecting prongs 142\*. The prongs 142\* are parallel to each other, have their top edges at the same elevation, their bottom edges at the same elevation, and are spaced apart at 120 degree intervals. The prongs 142\* ride in grooves 144\* (See FIG. 38) in the vertical leg 124\*. These grooves 144\* extend from the top edge 146\* of the vertical leg 124\* downwardly to a distance substantially equal to the height of the prongs 142\*, as seen in FIG. 38. The grooves 144\* lie inside the perimeter of the funnel 129\*, so, as the collar 138\* moves upwardly, the prongs 142\* move up into the interior of the funnel 129\*. The collar 138\* can move upwardly until its ring 139\* abuts the outer surface of the funnel 129\*, and it can move downwardly until the bottom surfaces 148\* of the prongs 142\* abut the surfaces 150\* at the bottom of the grooves 144\* (unless the drive mechanism prevents the collar 138\* from reaching its upper and lower limits).

Figure 36:
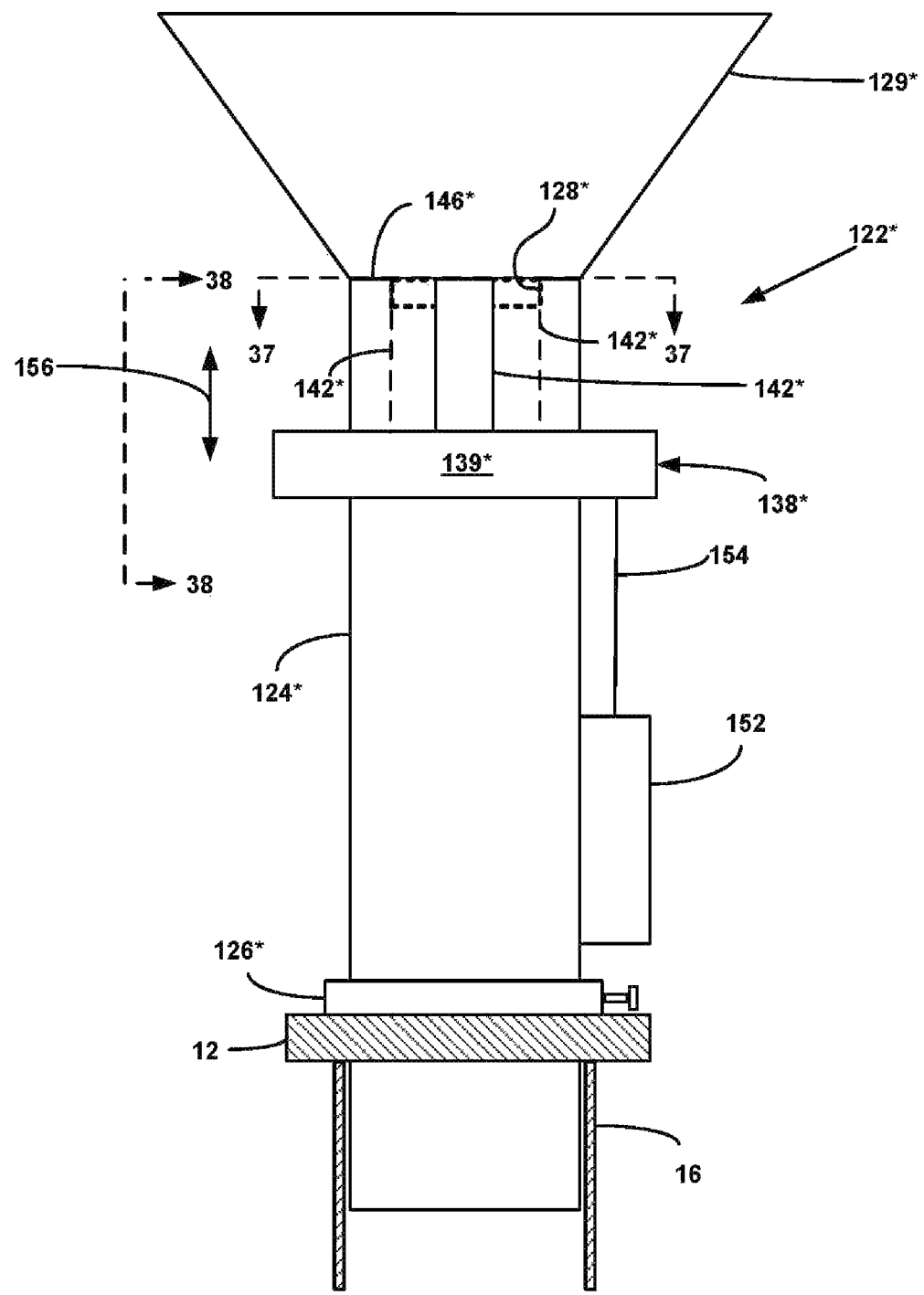
FIG. 36 is a side view of another embodiment of a catalyst dispensing device.
Figures 39A, 39B:
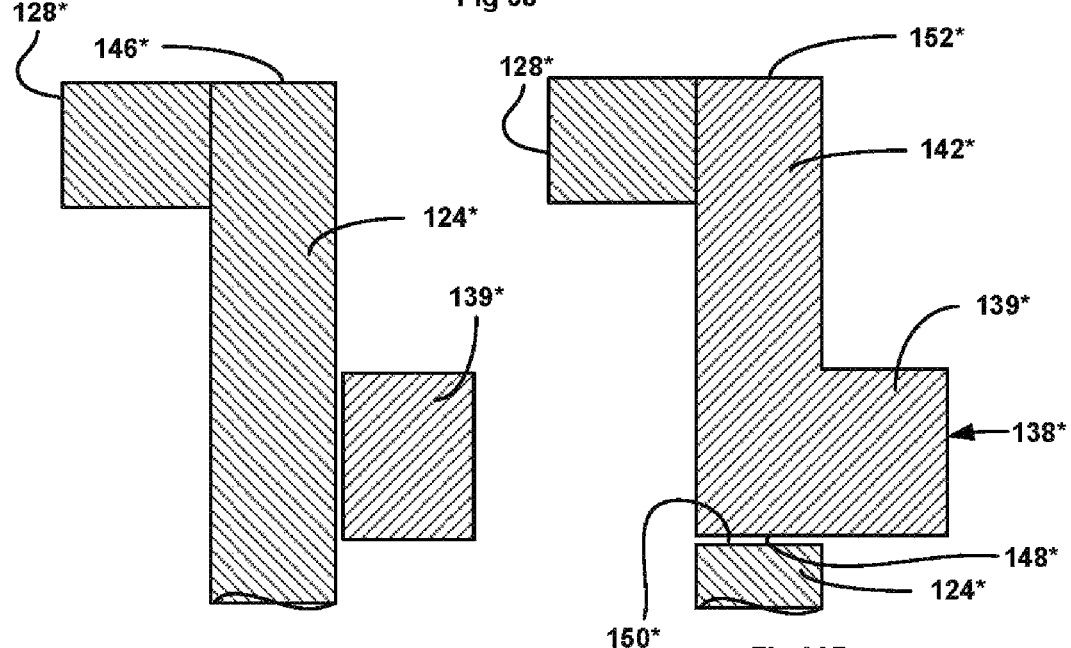
FIG. 39A is a section view along line 39A-39A of FIG. 38.
FIG. 39B is a section view along line 39B-39B of FIG. 38.

When the sleeve 138\* is in its lowered position, as seen in FIGS. 38, 39A, and 39B, the bottom surface 148\* of the prong 142\* rests on top of the surface 150\* at the bottom of the groove 144\* (see FIG. 39B), and the top surface 152\* of each prong 142\* is flush with the top edge 146\* of the vertical leg 124\* (as shown in FIGS. 36, 37, and 38).

Figure 40:
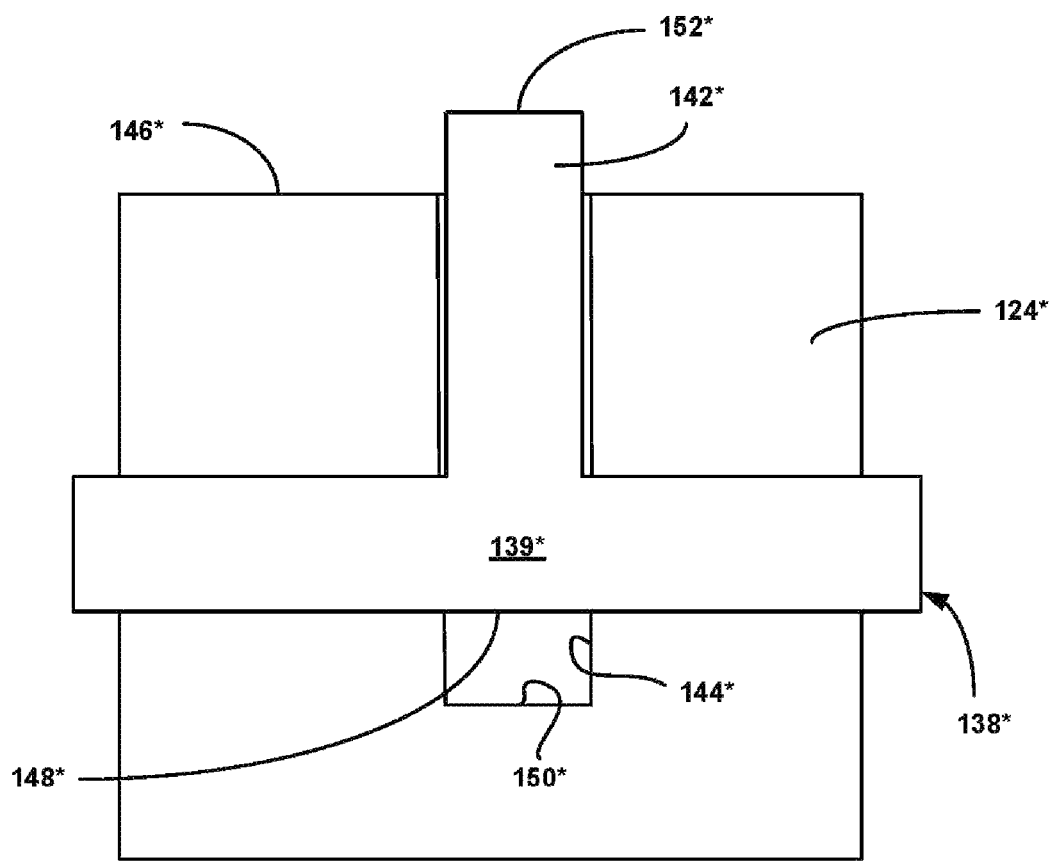
FIG. 40 is a side view, similar to that of FIG. 38, but with the bridge breaking device in the raised position.

When the sleeve 138\* is raised, as seen in FIG. 40, the top surface 152\* of each prong 142\* projects upwardly into the funnel area. This vertical movement of the prongs 142\* of the sleeve 13\* allows the prongs 142\* to impart a direct mechanical force to the pellets 18 adjacent to the opening 128\* that is different from the forces being applied to the surrounding pellets in order to break up any bridging that may occur within the funnel 129\* adjacent to the opening 128\*. Therefore, this catalyst dispensing device 122\* works in a very similar manner to the catalyst dispensing device 122 described earlier.

FIG. 36 shows an actuator 152 that is fixed relative to the vertical leg 124\* and that is functionally connected to the collar 138\* via a connecting rod 154. The actuator 152 imparts a linear, up-and-down vertical motion to the connecting rod 154, which, in turn, imparts the same motion to the collar 138\*, as illustrated by the arrow 156, in order to automate the bridge breaking function of the catalyst dispensing device 122\*.

Figure 26:
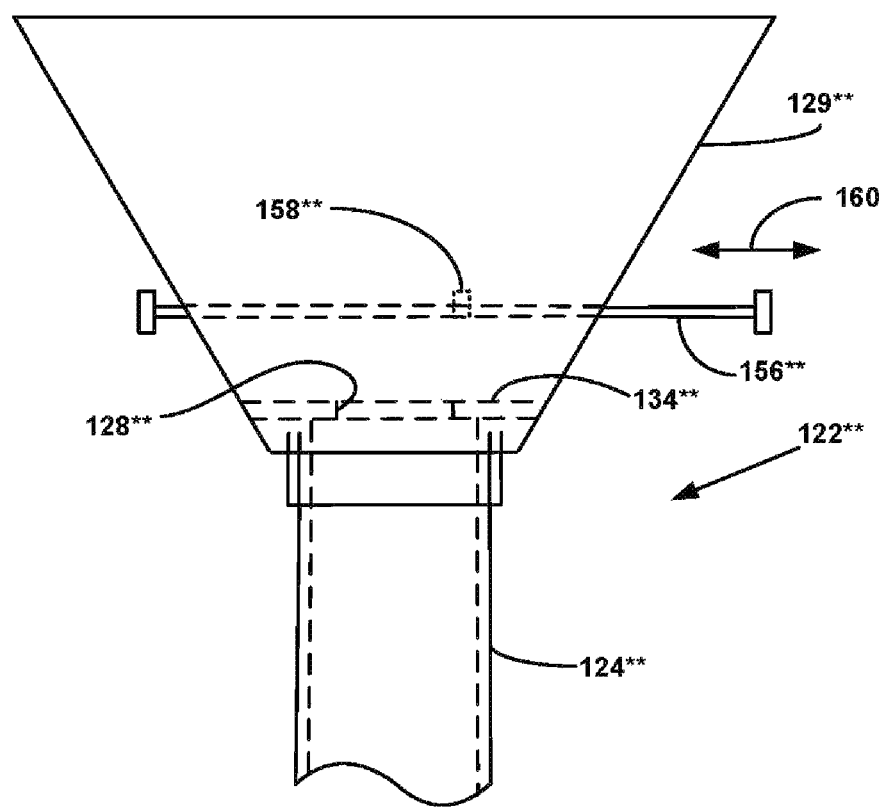
FIG. 26 is a side view of another alternate embodiment of a catalyst dispensing device, shown in a first position.
Figure 27:
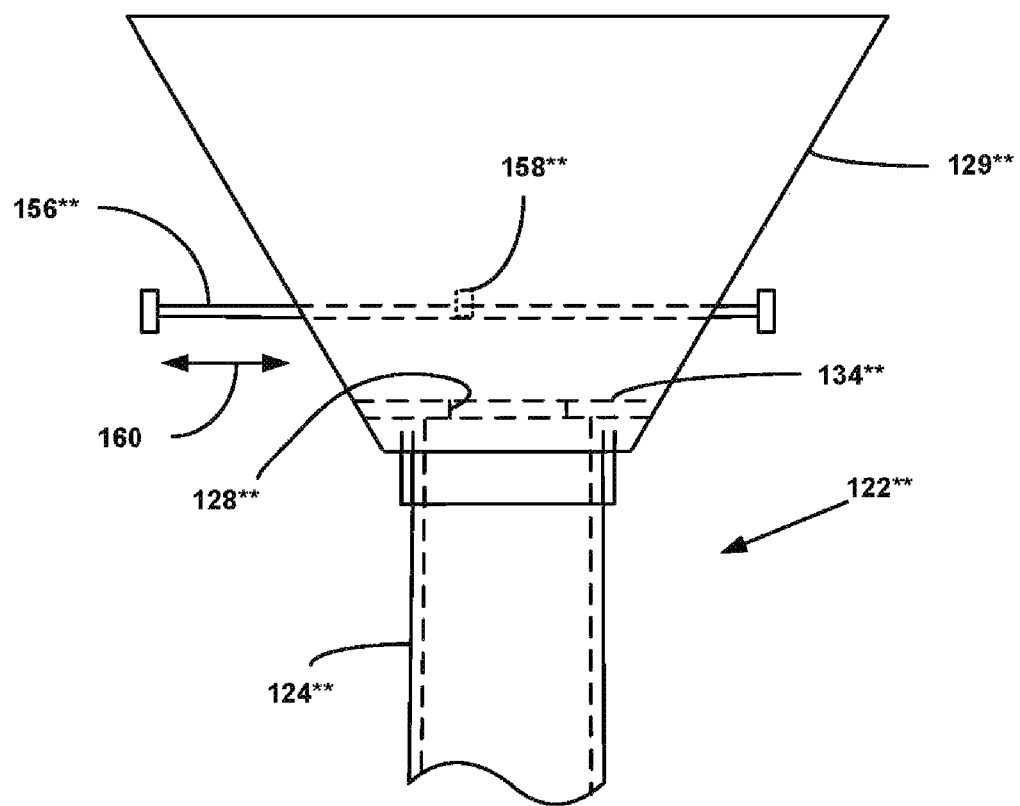
FIG. 27 is a side view of the catalyst dispensing device of FIG. 27, shown in a second position.

FIGS. 26 and 27 show yet another embodiment of a catalyst dispensing device **122\*\*. This catalyst dispensing device 122\* includes a vertical leg (or conduit) 124\*\* and a funnel 129\*\* which holds the pellets above the reactor tube. The top edge 134\*\* of the vertical leg 124\*\* defines a through opening 128\*\* with a smaller diameter than the rest of the leg 124\*\* and a smaller diameter than the inside diameter of the reactor tube 16 into which the leg 124\*\* is inserted to control the flow rate of pellets in order to prevent bridging in the leg 124\*\* and in the reactor tube 16. A short distance above the top edge 134\*\* of the vertical leg 124\*\* (that distance preferably being less than the smallest dimension of the pellets 18), a rod 156\*\* projects through the sides of the funnel 129\*\* and extends substantially across and over the opening 128\*\*. The rod 156\*\* may be a stiff rod or wire, or it may have some flexibility such as may be obtained by using a thin plastic strip. A small enlargement or bump 158\*\* is located midway along the length of the rod 156\*\*. As the rod 156\*\* reciprocates horizontally back and forth in the motion indicated by the arrow 160, the enlargement 158\*\* moves across the opening 128\*\* and imparts a direct mechanical force to at least one of the pellets adjacent to the opening 128\*\* that is different from forces being applied to the other surrounding pellets in order to break up any bridges formed by the catalyst pellets adjacent to the opening 128\*\*. This process continues repeatedly, with successive bridge forming followed by bridge breaking to load the reactor tube with catalyst pellets. The rod 156\*\* may be moved manually or through an automated, reciprocating mechanism such as a linear actuator that is fixed relative to the leg 124\*\***.

Figure 28:
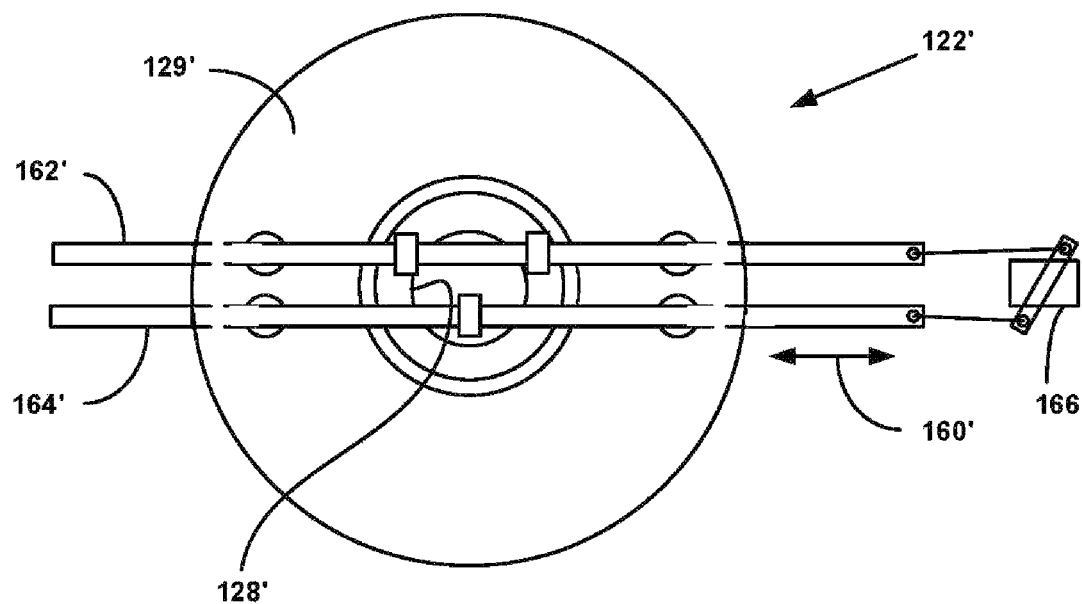
FIG. 28 is a plan view of an alternate embodiment of a catalyst dispensing device, similar to that of FIG. 26, but having two bridge breaking wires.

FIG. 28 is a plan view of another embodiment of a catalyst dispensing device 122'. This catalyst dispensing device 122' is identical to the catalyst dispensing device **122\*\* described above, except that it has two rods 162', 164' extending through the funnel 129' instead of the single rod 156\*\* described earlier. It should be noted that neither of these two rods 162', 164' is located directly above the centerline of the through opening 128' through which the catalyst pellets fall into the reactor tube 16. The rod or rods should be located close enough to the opening 128' to impart a localized, direct mechanical force to at least one of the pellets adjacent to the opening 128' that is different from the forces applied to the other surrounding pellets in order to break the bridges formed adjacent to the opening 128'**.

It should also be noted that the bumps **158\*\* and 158' in the rods are not strictly necessary for proper operation of the catalyst dispensing devices. They provide enhanced contact between the rod and the catalyst pellets and in this manner improve the bridge breaking characteristics of the device. Other means for enhancing the contact with the pellets 18**, such as roughening of the rod itself, may be used for the same end result.

FIG. 28 further shows a reciprocating rotary actuator 166 used to automate the reciprocating motion of the rods 162', 164' in the direction of the arrow 160'. Though not shown in this view, the actuator 166 may be used to reciprocate rods connected to a plurality of linearly-aligned catalyst dispensing devices 122'.

Figure 29:
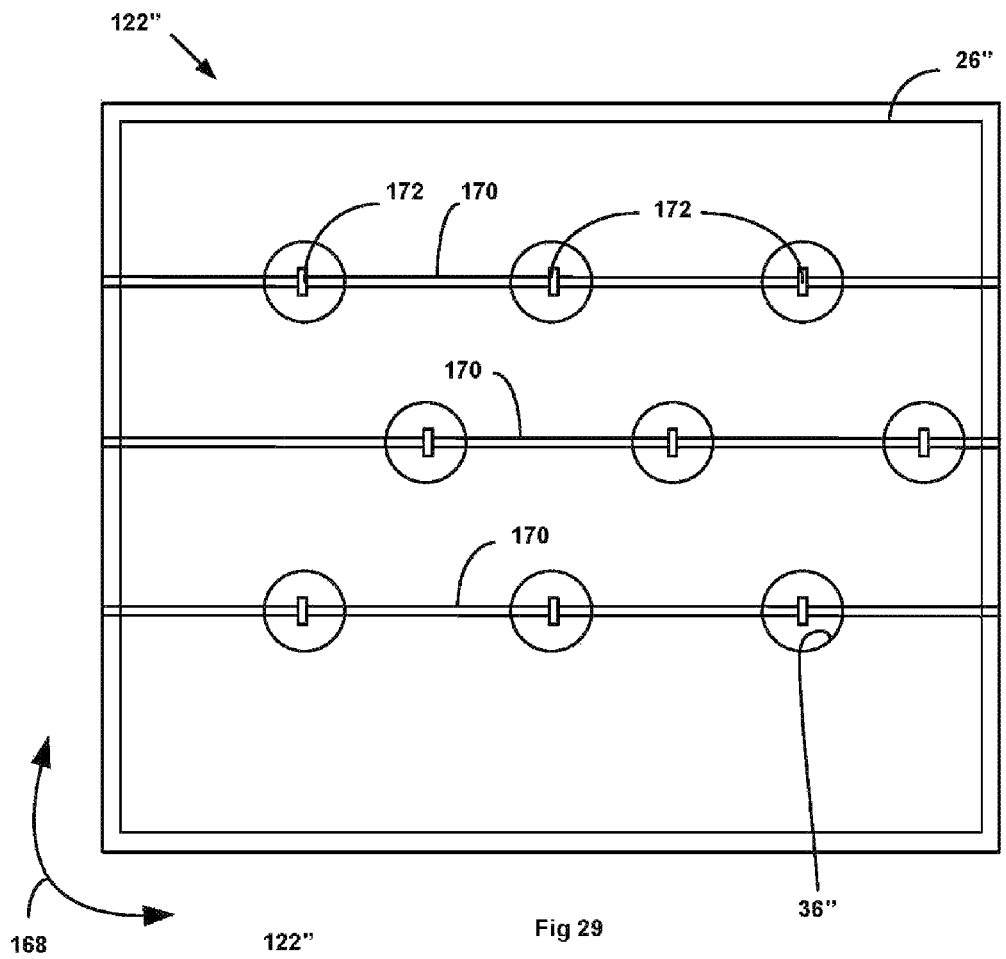
FIG. 29 is a plan view an alternate embodiment of a catalyst dispensing device, similar to that of FIG. 26, but for handling multiple tubes simultaneously.
Figure 30:
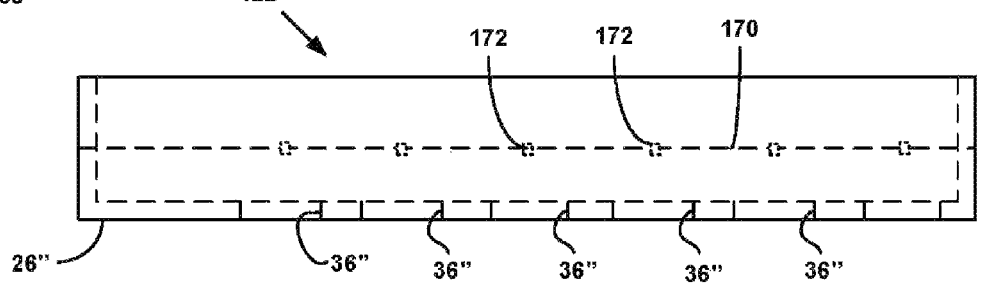
FIG. 30 is a side view of the catalyst dispensing device of FIG. 29.

FIGS. 29 and 30 show another embodiment of a catalyst dispensing device 122". This catalyst dispensing device 122" may be described as a hybrid between the catalyst dispensing device 24 of FIG. 6A and the catalyst dispensing device **122\*\* of FIG. 26. The catalyst dispensing device 122" includes a tray (or hopper) 26" with a plurality of through openings 36", similar to the tray 26 (See FIG. 11) of the catalyst dispensing device 24. The arrow 168 (See FIG. 29) indicates the reciprocating motion of the tray 26" to break any catalyst bridges by the tray 26" imparting a direct mechanical force to pellets resting on the underlying substrate within the openings 36" of the tray 26". The underlying substrate is not shown in this view, but has been identified earlier with respect to the description of the catalyst dispensing device 24**, as being either a template or a plurality of loading sleeves.

Figure 11:
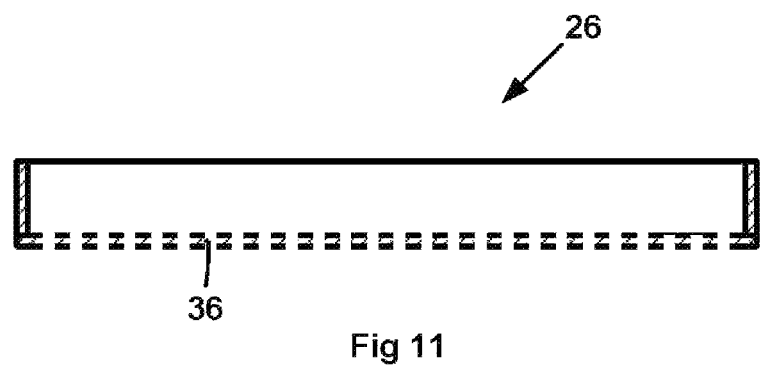
FIG. 11 is a schematic section view of the dispensing tray, taken along line 11-11 of FIG. 10.

A comparison of the tray 26 of FIG. 11 with the tray 26" of FIGS. 29 and 30 shows the addition of stationary rods 170 with resistance enhancing bumps 172 to the catalyst dispensing device 122", similar to the rod **156\*\* and bump 158\*\* of the catalyst dispensing device 122\*\* of FIG. 26. The reciprocating motion of the tray 26" relative to the stationary rods 170 (as indicated by the arrow 168) causes the rods 170 to impart a localized, direct mechanical force to the pellets adjacent to the openings 36" that is different from the forces applied to the surrounding pellets in order to break up catalyst bridges adjacent to the openings 36"**.

FIGS. 31-35 show yet another embodiment of a catalyst dispensing device 122^. This catalyst dispensing device 122^ is similar to the catalyst dispensing device 24 of FIG. 6A, but it has several separate bins or hoppers mounted on the dispensing tray 12^ so a measured load of catalyst pellets 18 is delivered into each reactor tube 16.

Figure 31:
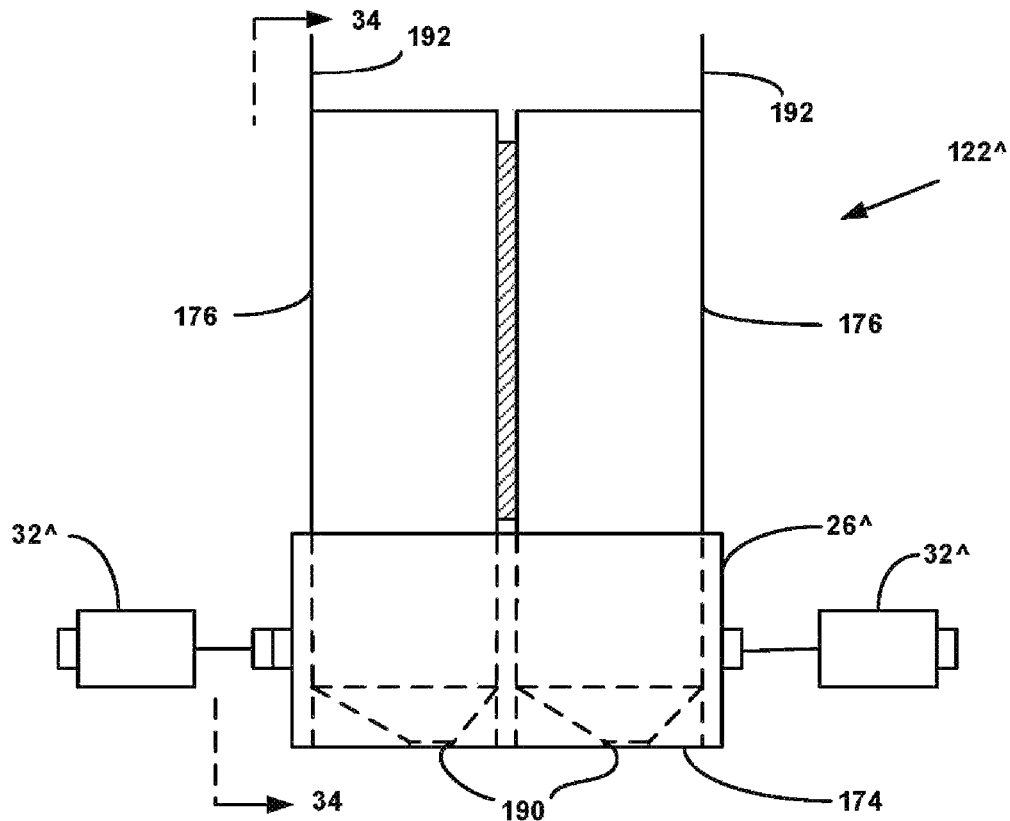
FIG. 31 is a side view of another embodiment of a catalyst dispensing device.

Referring to FIG. 31, and comparing it with FIG. 6A, the catalyst dispensing device 122^ includes a tray 26^ with a plurality of openings that are generally aligned with the openings in the top of the reactor tubes 16. It differs from the embodiment of FIG. 6A in that there are several bins 176 mounted on the tray 26^. The openings in the tray 26^ are the same size as and are aligned with the openings 190 in the bottoms of the bins 176, and the tray 26^ is thin enough that the openings in the tray are effectively the same as the openings 190 in the bottoms of the bins 176.

As with the embodiment of FIG. 6A, this embodiment includes a plurality of linear motion drives 32^ that impart a reciprocating motion to the tray 26^ (and to the bins 176 that are fixed relative to the tray 26^).

Figure 33:
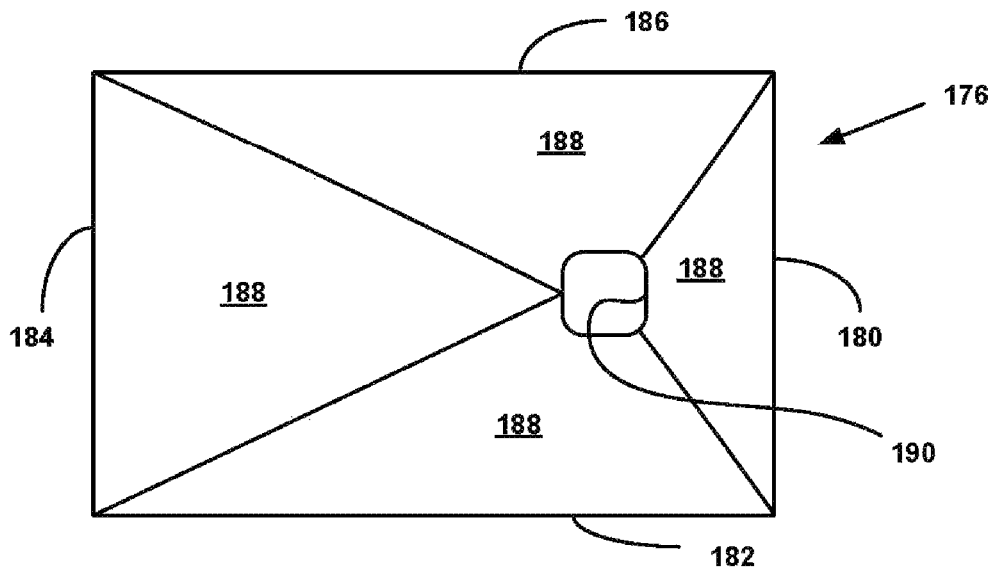
FIG. 33 is a plan view of one the bins of FIG. 31.
Figure 34:
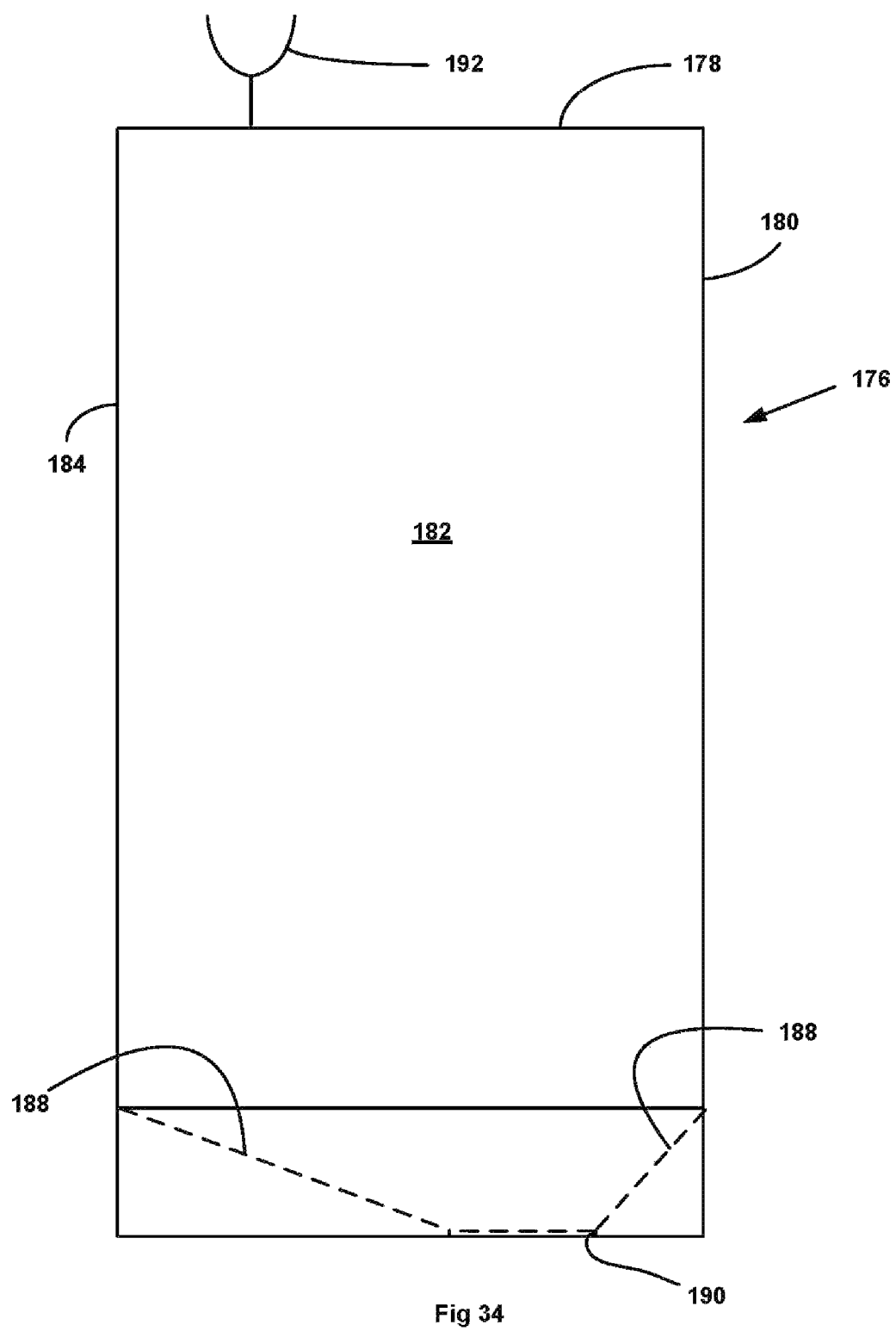
FIG. 34 is a side view of the bin of FIG. 33.

Referring to FIGS. 33 and 34, each dispensing bin 176 is a container having a generally rectangular cross-section with an open top 178, four side walls 180, 182, 184, and 186, and a bottom with sloping ramps 188 that directs catalyst pellets to the through opening 190 (which corresponds to the opening 36 in the tray 26 of FIG. 6A). Alternatively, each bin 176 may have an open bottom which matches up directly with its corresponding dispensing plate 174 which is part of the dispensing tray 26^, and these dispensing plates 174 that have the sloping ramps 188 direct catalyst pellets to the through openings 190.

The cross-section of the dispensing bin 176 is large enough relative to the size of the catalyst pellets that the pellets will not bridge in the bin 176 until they reach the bottom of the bin 176 adjacent the opening 190. Any bridging in the bin 176 will occur at the very bottom of the bin 176, just above the opening 190. Just as with the embodiment of FIG. 6A as described earlier, the reciprocating motion of the tray 26^ will impart a direct mechanical force to the pellets resting on the template below the tray 26^ that is different from the force being applied to surrounding pellets, thereby causing relative motion between the pellets forming a bridge so as to break up the bridges and allow the pellets to fall through the openings 190 and into the reactor tubes 16.

This catalyst dispensing device 122^ has a yoke 192 that projects above the bins 176, as shown in FIGS. 31 and 34, which assists with dispensing the catalyst pellets into the bins 176, as will now be described.

Figure 32:
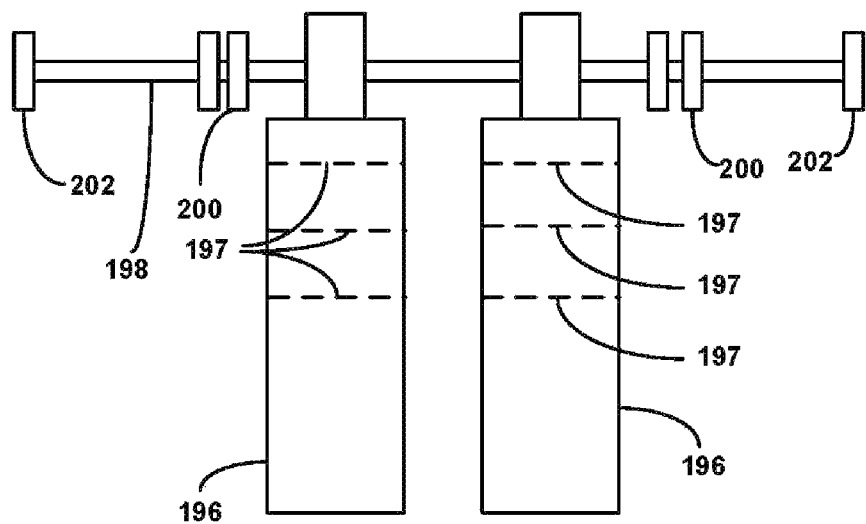
FIG. 32 side view of a bin transport device for the catalyst dispensing device of FIG. 31.

With this embodiment, catalyst pellets are delivered in catalyst transport devices 196, which are open top containers that are adjustably mounted together on a transport bar 198 as shown in FIG. 32 such that their positions along the length of the transport bar 198 may be adjusted to match the location and spacing of the dispensing bins 176. The transport bins 196 may be sized as needed. An exact, measured charge or load of catalyst pellets 18 (See FIGS. 35A-35C) is loaded into each transport bin 196 outside of or adjacent to the reactor prior to the dispensing operation. This charge may be measured by volume, by weight, or by some other desired means. In this particular embodiment, the transport bins 196 have marking lines 197 at various elevations, which indicate the various volume charges of pellets that would be loaded into the transport bin 196 if the pellets reached the particular marking line 197.

There are spools 200 mounted on the loading bar 198, and these spools rest on the yokes 192 of the dispensing bins 176. The spools 200 aid in the proper alignment of the transport bins 196 with the respective dispensing bins 176 and provide a bearing surface to support the transport bins 196 on the yokes 192. There also are handles 202 mounted on the transport bar 198 to assist the operators in pivoting the transport bins 196 to empty the catalyst pellets 18 into the respective dispensing bins 176, as shown in FIGS. 35B and 35C.

Figure 35A:
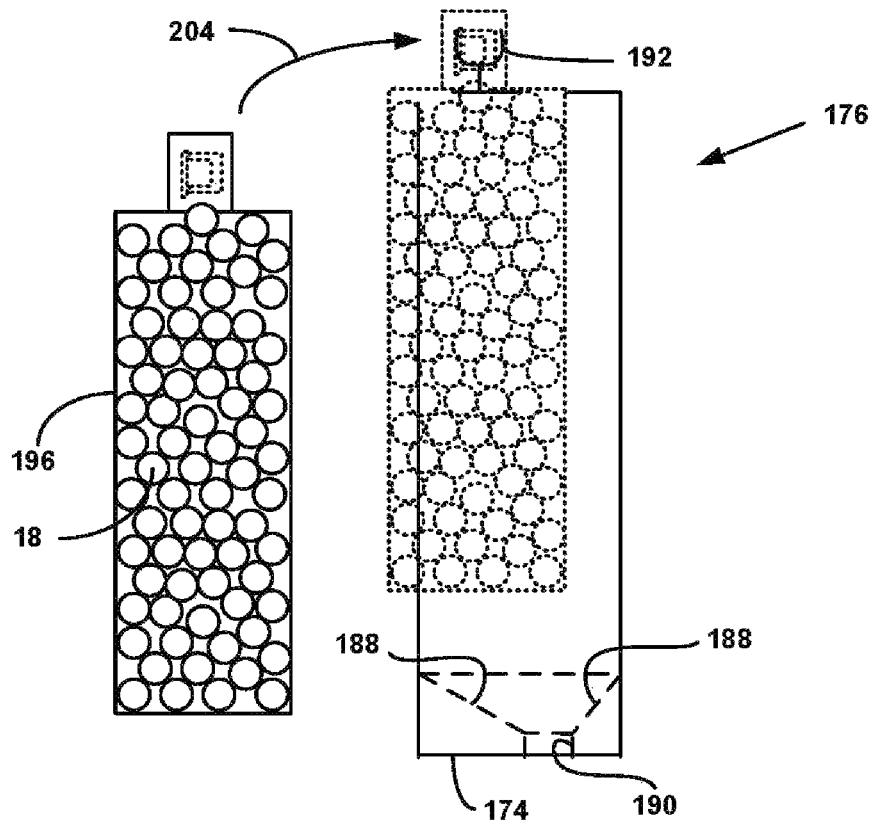
FIG. 35A is a side view of the bins of FIG. 31 and the bin transport device of FIG. 32, in preparation for transferring catalyst into the bins.
Figure 35B:
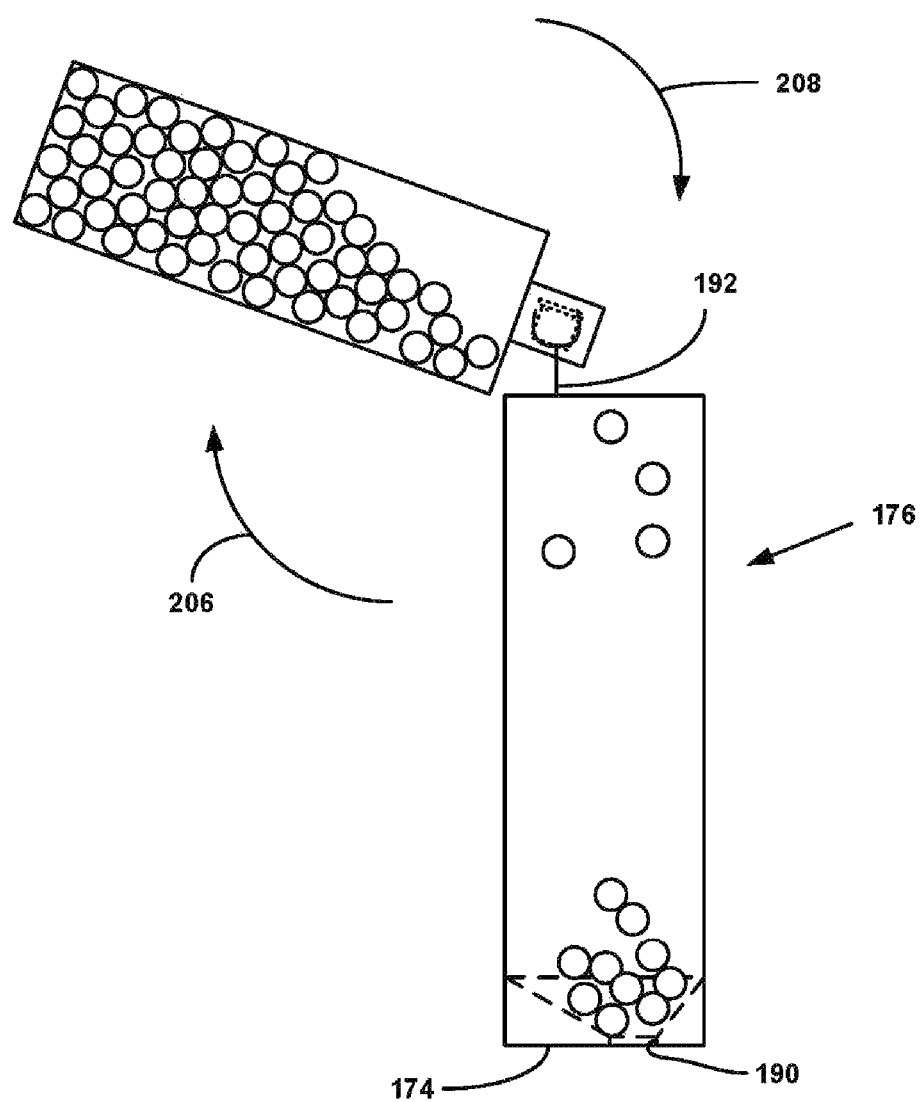
FIG. 35B is a side view, similar to FIG. 35A, but with the bin transport device starting to empty the catalyst into the bins.
Figure 35C:
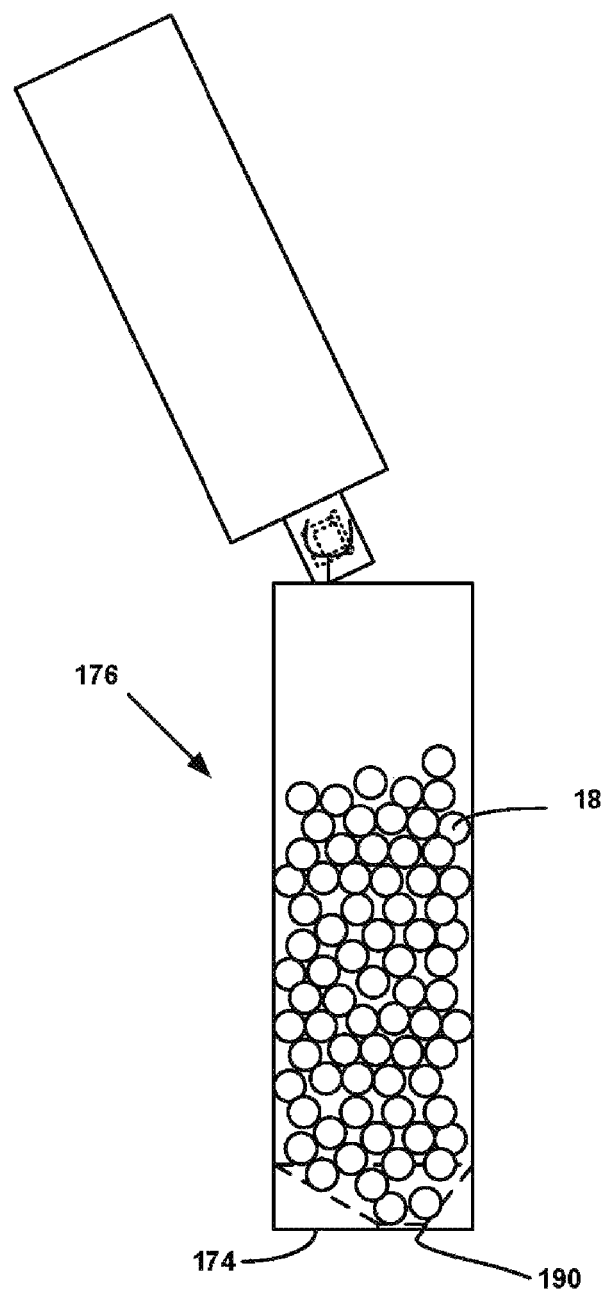
FIG. 35C is a side view, similar to FIG. 35, but with the catalyst in the bin transport device emptied into the bins.

Initially, a measured charge of catalyst pellets 18 is loaded into each of the transport bins 196 (See FIG. 35A). This preferably is done outside of the reactor 13 (See FIG. 1). A plurality of these catalyst transport bins 196 may be used such that some of them are being loaded while others are being used to transport catalyst to the catalyst dispensing device 122^, or the catalyst pellets may be delivered to the site pre-measured and pre-loaded into the transport bins 196.

The transport bins 196 may be picked up by the operators and transferred into the reactor vessel 13 through the manhole 17 for fixed head reactors or onto the reactor tube sheet area for removable head reactors either individually or in groups that are already mounted on a transport bar 198. Referring to FIG. 35A, the catalyst transport bins 196, mounted on the transport bar 198, are moved in the direction of the arrow 204, and placed onto the catalyst dispensing device 122^ such that the spools 200 rest on the yokes 192, which automatically aligns the transport bins 196 with the dispensing bins 176, as shown in phantom. The operators then pivot the transport bar 198 in the direction shown by the arrows 206, 208 of FIG. 35B until all the catalyst pellets 18 are emptied from the transport bins 196 into their respective dispensing bins 176, as shown in FIG. 35C.

Once the catalyst is loaded into the dispensing bins 176, the transport bar 198 with attached transport bins 196 is removed and the motion drives 32^ are powered up to start the reciprocating motion of the tray 26^ and of the dispensing bins 176 that are fixed to the tray 26^. Note that the catalyst dispensing device 122^ is mounted on a template 20, or on a plurality of loading sleeves 22, or may even be mounted directly on the tube sheet 12. If no template or loading sleeves are used, the openings 190 should be small enough to control the flow rate of pellets into the reactor tubes 16 to prevent bridging inside the reactor tubes 16.

The reciprocating motion of the catalyst dispensing device 122^ parallel to the tube sheet or template 20 imparts a localized force to at least one of the pellets resting on the template 20 or loading sleeve 22 or tube sheet 12 that is different from the force being applied to the surrounding pellets in order to break up any bridging in the dispensing bins 176 adjacent to the openings 190 to keep the catalyst pellets 18 flowing into the respective reactor tubes 16. This process continues repeatedly, with successive bridge forming followed by bridge breaking to load the reactor tubes 16 with catalyst pellets 18.

It should be noted that the speed of the reciprocating motion of the catalyst dispensing device 122^ may be adjusted as desired to achieve the desired flow of pellets through the dispensing device 122^ and into the reactor tubes 16.

Device Used for Dispensing and De-Dusting Catalyst

As explained earlier, in the background section, the reactor tubes may be quite long, housed in a structure several stories tall, and the pellets may be transported up several stories to an elevation above the top of the tubes so they may then flow by gravity into the tubes. The pellets typically are supplied in 2,000 pound (or larger) "super sacks", 55 gallon drums, mini drums, metal bins or plastic bags loaded in pallet-mounted cardboard boxes.

Figure 41:
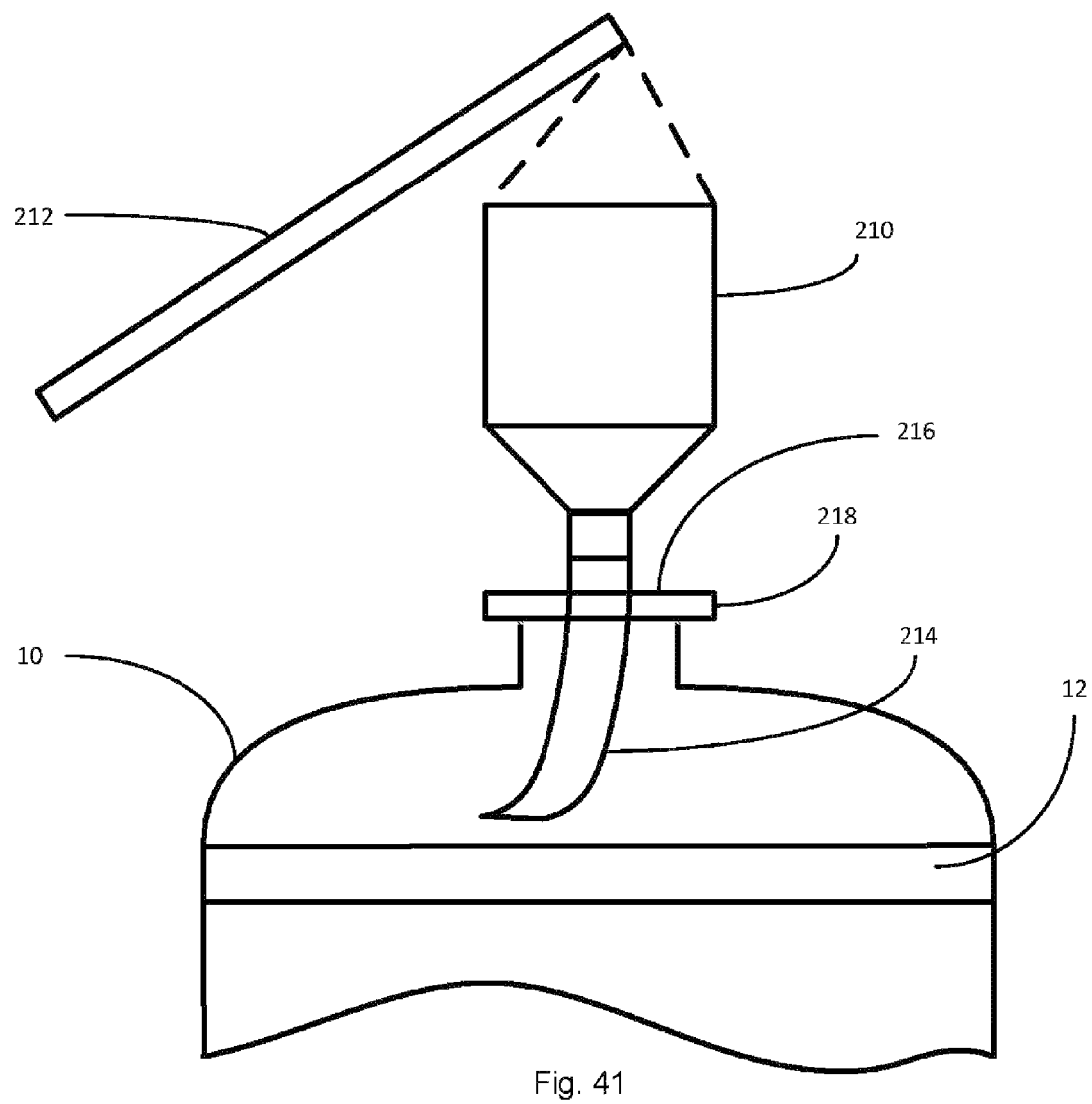
FIG. 41 is a schematic of the upper portion of the reactor vessel of FIG. 1 when dispensing catalyst into the reactor vessel in the prior art.

FIG. 41 is a broken away schematic of the transportation and dispensing of catalyst pellets from a super sack 210, as practiced in the prior art. The super sack 210 is picked up and supported above the reactor vessel 10 by a crane 212. A heavy duty hose 214 (typically a 4 inch to 6 inch diameter hose) is connected to the bottom of the super sack 210 and extends through a top opening 216 in the top flange 218 of the reactor vessel 10. Personnel (not shown) standing on the upper tube sheet 12 of the reactor vessel 10 manually handle the hose 214 inside the reactor vessel 10 to load the catalyst pellets from the super sack 210 onto a template or onto loading sleeves (not shown) placed on top of the upper tube sheet 12.

The hose 214 becomes full of catalyst pellets as the operator chokes off the free end of the hose 214 to regulate the flow of catalyst onto the tube sheet 12. This makes the hose 214 very heavy and very difficult to move around to various positions within the reactor. This also generates a large amount of dust due to the abrasion of the catalyst both in the super sack 210 and in the hose 214. In addition, the catalyst pellets tend to segregate themselves by size as they come out of the super sack 210, which prevents consistent loading into the reactor tubes.

Figure 42:
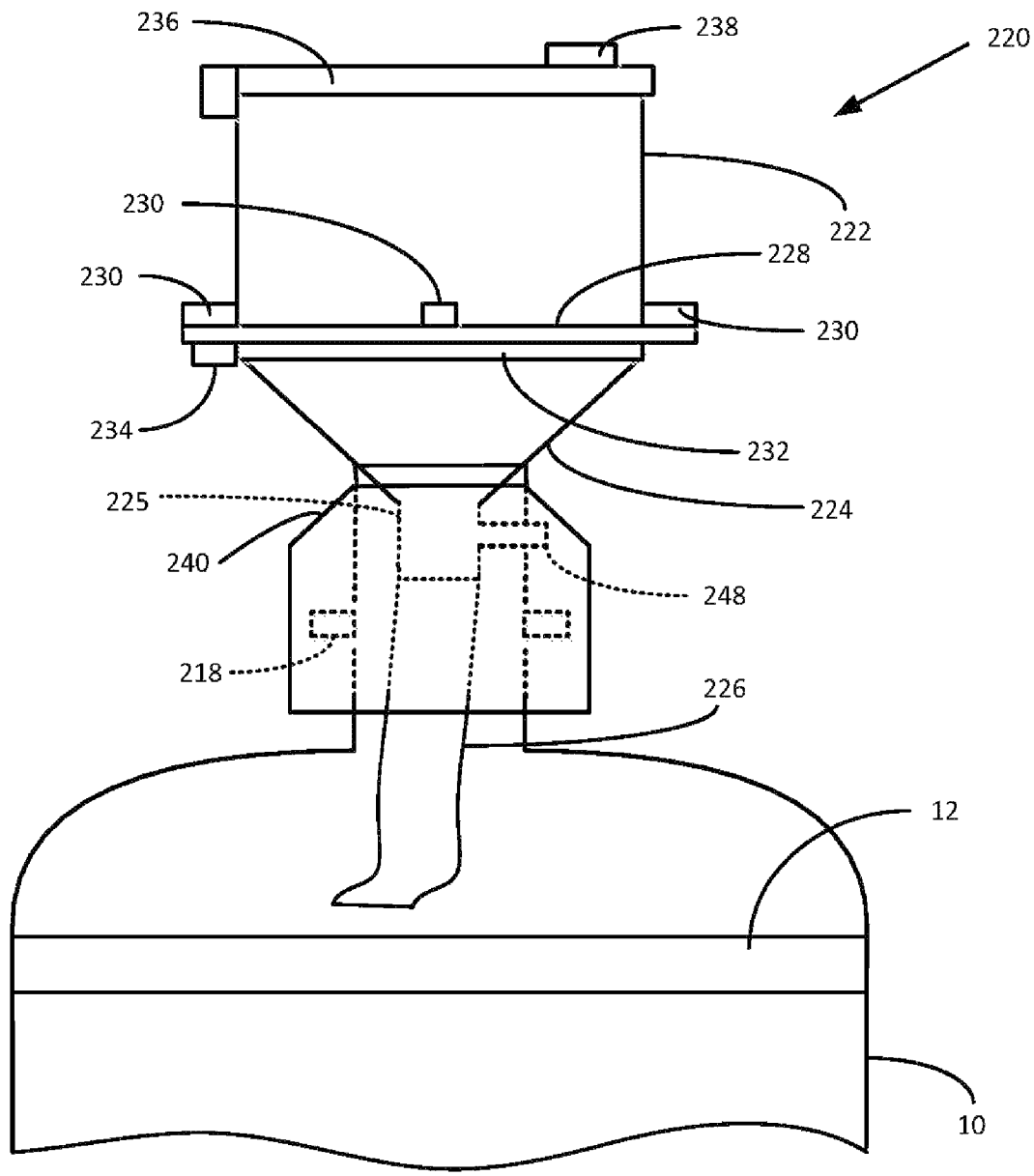
FIG. 42 is a schematic, similar to that of FIG. 41, but when dispensing catalyst into the reactor vessel using an embodiment of a pellet dispensing device made in accordance with the present invention.
Figure 43:
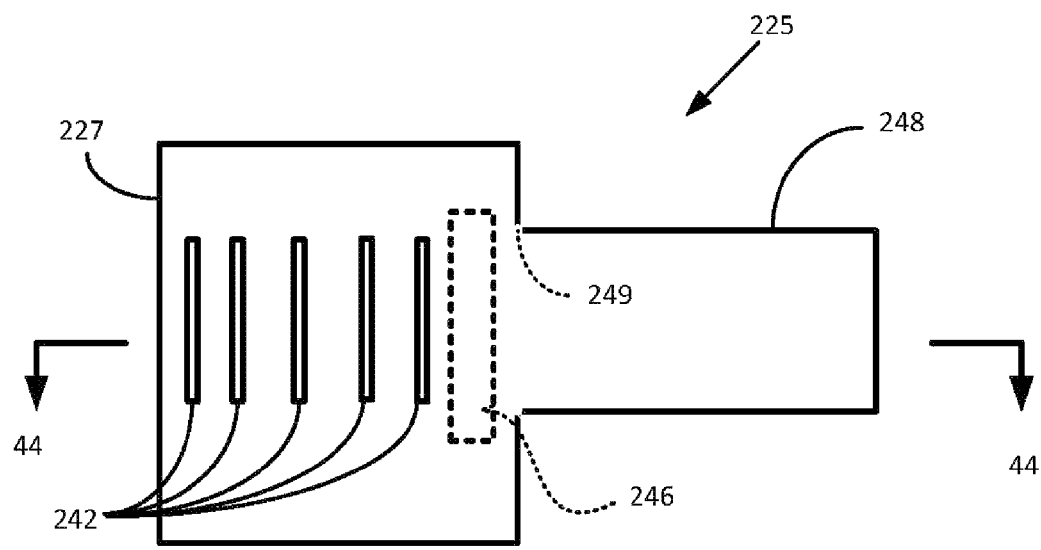
FIG. 43 is a more detailed side view of the de-dusting adapter of FIG. 42.
Figure 44:
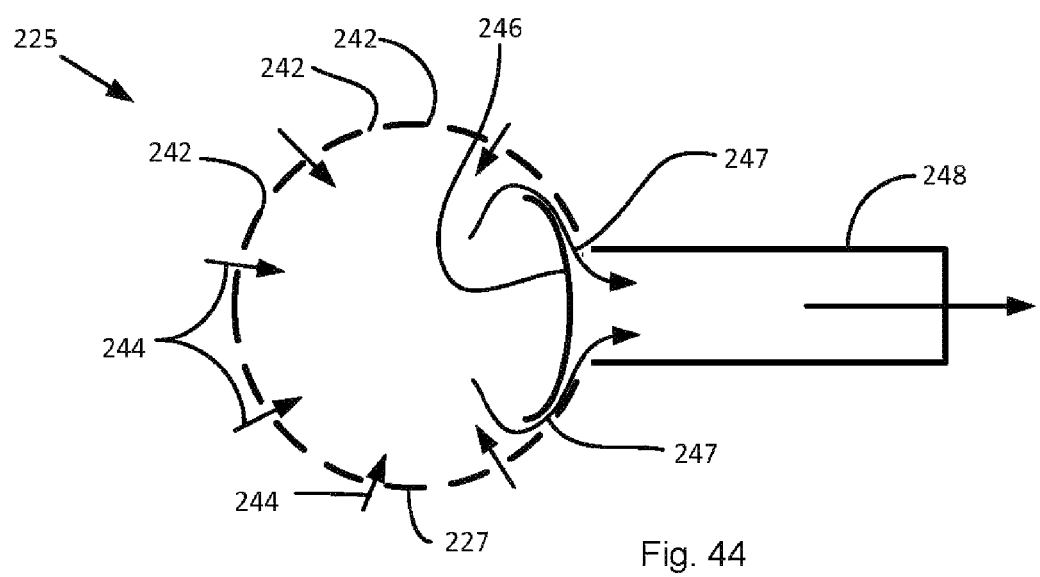
FIG. 44 is a view along line 44-44 of FIG. 43.

FIGS. 42-44 show a device 220 for dispensing catalyst pellets from a super sack, or from any other container, to a delivery point in the reactor vessel 10. The catalyst dispensing device 220 includes a hopper 222 preferably sized to handle at least all the contents of the container being emptied, such as the 2,000 pounds of catalyst in a super sack. This hopper 222 rests atop a funnel-shaped transition piece 224, which, in turn, connects to a de-dusting adapter 225, which connects the transition piece 224 to a flexible hose (or conduit) 226. As explained in more detail below, the hose 226 may be a light duty hose, as it is not intended for this hose 226 to be fully loaded with catalyst pellets. The light-weight nature of the hose 226 and the fact that it is not loaded up with catalyst pellets makes it easy to move it around to where the catalyst is needed within the reactor.

Between the hopper 222 and the transition piece 224 is a reciprocating plate 228 which is very similar to the bottom of the tray 26 of the catalyst dispensing device 24 of FIG. 6A, including a plurality of through openings and linear motion drive devices 230, which correspond to the through openings 36 and linear motion drives 32 of FIG. 6A. The reciprocating plate (upper plate) 228 lies on top of a second plate (lower plate) 232. This second plate 232 has its own linear motion drive 234. The second plate 232 also defines a plurality of through openings (not shown), each of which substantially aligns with a corresponding opening in the upper reciprocating plate 228 when the second plate 232 is in a first position. However, when the linear motion drive 234 of the second plate 232 is actuated, the second plate 232 moves to a second position, wherein each of the openings on the second plate 232 is in complete misalignment with its corresponding through opening on the reciprocating plate 228. When it is in the second, non-aligned position, the second plate 232 acts as a positive shut-off valve to interrupt all flow of catalyst pellets from the hopper 222 to the hose or conduit 226.

The hopper 222 includes a hinged, watertight cover 236, which can be opened for bulk dispensing of catalyst pellets as from a super sack. A second, smaller cover 238 may be used to load smaller quantities of catalyst pellets (as from small boxes or bags) or for continuous dispensing of catalyst pellets (as through a hose). In a preferred embodiment, both of these covers 236, 238 are watertight to allow continued dispensing of catalyst pellets into the reactor vessel 10 even in adverse weather conditions. For instance, one or more super sacks may be emptied into the hopper 222 via the cover 236 while it is not raining. Then, even if it starts to rain, the hopper 222 may be unloaded into the reactor vessel 10. A weather shield 240 may be installed over the de-dusting adapter 225 and the flange connection 218 for further assurance of water-tightness, if required.

Referring now to FIGS. 43 and 44, the de-dusting adapter 225 has a cylindrical wall 227 equidistant about an imaginary vertical axis, and that cylindrical wall 227 has an outer surface and an inner surface. A nozzle 248 extends horizontally from a large, circular opening 249 in the cylindrical wall 227. The cylindrical wall 227 defines a plurality of radially-arranged slotted openings 242 for admitting air into the interior of the cylinder 227, as shown by the arrows 244 in FIG. 44. A partial cylindrical baffle wall 246 creates a tortuous path 247 for the air being drawn through the de-dusting adapter 225 to ensure that only lighter-weight dust particles are pulled out of the de-dusting adapter 225 via a vacuum source (not shown) connected to the nozzle 248 projecting from one side of the de-dusting adapter 225. Note that the baffle 246 could be replaced by a fairly tight wire mesh screen which covers the opening 249 into the nozzle 248, such that only small dust particles are extracted from the de-dusting adapter 225 while larger catalyst pellets are rejected and allowed to fall into the hose 226.

It should also be noted that, even if there is no provision for slotted openings 242 around the de-dusting adapter 225, air may be drawn up through the free end of the hose 226, up through the length of the hose 226, through the dedusting apparatus 225 and out the nozzle 248 to the vacuum source discussed above. In either case, the vacuum level in the vacuum source is adjusted to provide the degree of de-dusting that is desired, vacuuming a stream of gas out of the side of the cylinder 227 (which is part of the conduit) as the pellets flow through the cylinder 227 in order to remove dust from the pellets.

To operate the catalyst dispensing device 220, the device 220 is first installed onto the top flange 218 of the reactor vessel 10, as shown in FIG. 42. Pneumatic air is provided for the linear motion drives 230 of the reciprocating plate 228 as well as for the linear motion drive 234 of the second plate (shut-off plate) 232. The hopper 222 is at least partially filled with catalyst pellets, which enter through the large cover 236 or the small cover 238 while the shut-off plate 232 is in the closed position. A vacuum source is also connected to the nozzle 248 of the de-dusting adapter 225.

Once the personnel are ready and inside the reactor vessel 10, the actuator 234 for the shut-off plate 232 may be actuated to open the path, allowing catalyst pellets to fall from the hopper 222, through openings in both plates 228, 232, to the hose 226. Since the effective diameter of the aligned openings in the upper plate 228 and lower plate 232 are only slightly larger in diameter than the catalyst pellets, only a small amount of pellets will fall through the aligned openings in the plates before bridges of pellets form in the hopper 222 above the respective openings, preventing more catalyst pellets from falling into the hose or conduit 226. The actuators 230 for the reciprocating upper plate 228 may now be actuated to provide localized, direct mechanical force to continuously and gently break the bridges forming in the hopper 222, allowing the catalyst pellets to fall continuously through the aligned openings in the upper and lower plates 228, 232 and into the hose 226. The operator directs the free end of the hose 226 as required to deposit the de-dusted catalyst pellets at delivery points where they are needed.

In a preferred embodiment, the operator inside the reactor vessel 10 has direct control of the pneumatic air to the linear motion drive 234 of the shut-off plate 232 in order to stop the flow of catalyst pellets to the upper tube sheet 12 of the reactor vessel 10. Preferably, the operator also has direct control of the pneumatics to the linear motion drives 230 of the reciprocating plate 228 so he can regulate the frequency of reciprocation of the plate 228, which regulates the flow of catalyst pellets by regulating the frequency with which the bridges impeding the flow of catalyst pellets are broken. In one extreme, if the frequency of reciprocation of the plate 228 is reduced to zero (the air to the linear motion drives 230 is shut off), the flow of catalyst pellets will quickly stop due to bridging of catalyst above the openings in the reciprocating upper plate 228.

Using the catalyst dispensing device 220, the hopper 222 is emptied evenly, gradually, gently, and from the bottom. That is, the catalyst pellets closest to the reciprocating plate 228 are always the first to be drawn out of the hopper 222. A metered flow rate of catalyst pellets, controlled by the operator, flows down through the transition piece 224 and through the de-dusting adapter 225, where the dust generated thus far by the handling of the catalyst pellets is removed, as discussed earlier. The de-dusted catalyst pellets proceed down the hose 226 to where the operator wants them to be deposited. Since the flow rate can be controlled by the operator, and the flow of catalyst pellets can be stopped at the bottom of the hopper 222 by the operator (either by stopping the reciprocation of the upper plate 228 or by actuating the actuator 234 for the lower, shut-off plate 232), the hose 226 need not ever be full of catalyst pellets. This makes it much easier for the operator to handle the hose 226, and a lighter weight hose can be used than is the case with the prior art arrangement shown in FIG. 41.

It will be obvious to those skilled in the art that modifications may be made to the embodiments described above without departing from the scope of the present invention as claimed.

What is claimed is:

1. A method for dispensing pellets to a delivery point, comprising the steps of:
providing a hopper for holding a plurality of pellets at an elevation above the delivery point;
loading a plurality of pellets into the hopper;
providing a conduit through which the pellets pass in order to flow from the hopper to the delivery point;
defining a fixed diameter first opening through an upper horizontal plate through which the pellets must pass in order to flow from the hopper into the conduit, wherein the diameter of the first opening is small enough relative to the diameter of the pellets that the pellets form a bridge above the first opening;
and further providing a lower horizontal plate directly below said upper horizontal plate, said lower horizontal plate defining a second opening aligned with the first opening, wherein there is a pellet resting on the lower horizontal plate adjacent to the first opening; and creating movement in the horizontal direction of one of the upper and lower horizontal plates relative to the other of the upper and lower horizontal plates so that the upper horizontal plate contacts said pellet to impart a localized, direct mechanical force to said pellet that is different from forces being applied to the surrounding pellets in order to disrupt the formation of bridges above the first opening while maintaining the fixed diameter of the first opening.

2. A method for dispensing pellets to a delivery point, comprising the steps of:
providing a hopper for holding a plurality of pellets at an elevation above the delivery point;
loading a plurality of pellets into the hopper;
providing a conduit through which the pellets pass in order to flow from the hopper to the delivery point;
defining a fixed diameter first opening through which the pellets must pass in order to flow from the hopper into the conduit, wherein the diameter of the first opening is small enough relative to the diameter of the pellets that the pellets form a bridge above the first opening; and
imparting a localized, direct mechanical force to at least one of the pellets adjacent to the first opening that is different from forces being applied to the surrounding pellets in order to disrupt the formation of bridges above the first opening while maintaining the fixed diameter of the first opening;
wherein the step of imparting a localized, direct mechanical force includes mounting a rod on the hopper extending in a linear direction across the hopper above the first opening and creating relative movement in the linear direction between the rod and the hopper.

3. A method for dispensing pellets to a delivery point as recited in claim 2, wherein said conduit includes a tubular upper portion having a fixed diameter defining an inlet opening at the top of the conduit, and said fixed diameter first opening is the inlet opening at the top of the conduit.

4. A method for dispensing pellets to a delivery point, comprising the steps of:
providing a hopper for holding a plurality of pellets at an elevation above the delivery point;
loading a plurality of pellets into the hopper;
providing a conduit through which the pellets pass in order to flow from the hopper to the delivery point;
defining a fixed diameter first opening through an upper horizontal plate through which the pellets must pass in order to flow from the hopper into the conduit, wherein the diameter of the first opening is small enough relative to the diameter of the pellets that the pellets form a bridge above the first opening; and
imparting a localized, direct mechanical force to at least one of the pellets adjacent to the first opening that is different from forces being applied to the surrounding pellets in order to disrupt the formation of bridges above the first opening while maintaining the fixed diameter of the first opening;
wherein the step of imparting a localized, direct mechanical force includes rotating the upper horizontal plate in a horizontal plane.

5. A method for dispensing pellets to a delivery point as recited in claim 4, wherein the upper horizontal plate defines at least one upwardly-projecting ridge.

6. A method for dispensing pellets to a delivery point, comprising the steps of:
providing a hopper for holding a plurality of pellets at an elevation above the delivery point;
loading a plurality of pellets into the hopper;
providing a conduit through which the pellets pass in order to flow from the hopper to the delivery point;
defining a fixed diameter first opening through which the pellets must pass in order to flow from the hopper into the conduit, wherein the diameter of the first opening is small enough relative to the diameter of the pellets that the pellets form a bridge above the first opening; and
imparting a localized, direct mechanical force to at least one of the pellets adjacent to the first opening that is different from forces being applied to the surrounding pellets in order to disrupt the formation of bridges above the first opening while maintaining the fixed diameter of the first opening;
wherein said conduit includes a tubular upper portion having a fixed diameter defining an inlet opening at the top of the conduit, and said fixed diameter first opening is the inlet opening at the top of the conduit;
wherein the step of imparting a localized, direct mechanical force includes providing a sleeve around the conduit adjacent to the first opening and moving the sleeve up and down relative to the conduit.

* * * * *